(12) United States Patent
Shimizu et al.

(10) Patent No.: US 7,814,808 B2
(45) Date of Patent: Oct. 19, 2010

(54) WORM GEAR MECHANISM AND ELECTRIC POWER STEERING APPARATUS EQUIPPED WITH THE WORM GEAR MECHANISM

(75) Inventors: Yasuo Shimizu, Wako (JP); Katsuji Watanabe, Wako (JP); Takahiro Aoki, Wako (JP); Yasuhiro Terada, Wako (JP); Ryoji Toyofuku, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 898 days.

(21) Appl. No.: 11/114,559

(22) Filed: Apr. 26, 2005

(65) Prior Publication Data
US 2005/0235768 A1  Oct. 27, 2005

(30) Foreign Application Priority Data
Apr. 26, 2004  (JP)  ............................. 2004-130251
Jan. 12, 2005  (JP)  ............................. 2005-005452

(51) Int. Cl.
*F16H 55/18* (2006.01)
(52) U.S. Cl. .................... 74/409; 74/388 PS; 74/425
(58) Field of Classification Search ............... 74/89.14, 74/388 PS, 409, 425, 440, 458, 461
See application file for complete search history.

(56) References Cited

U.S. PATENT DOCUMENTS

| | | | | |
|---|---|---|---|---|
| 1,982,037 A | * | 11/1934 | Wildhaber | ................... 74/413 |
| 2,702,995 A | * | 3/1955 | Biedess | ........................ 464/71 |
| 4,719,813 A | * | 1/1988 | Chalik | .......................... 74/409 |
| 5,934,144 A | * | 8/1999 | Marinkovic | .................. 74/440 |
| 6,170,349 B1 | * | 1/2001 | Tanaka et al. | ................ 74/409 |
| 6,339,967 B1 | * | 1/2002 | Tanaka et al. | ................ 74/409 |
| 6,354,395 B1 | * | 3/2002 | Cheng et al. | ................ 180/444 |
| 6,408,707 B1 | * | 6/2002 | Kimura et al. | ................ 74/409 |
| 6,497,041 B2 | * | 12/2002 | Fujita et al. | .............. 29/893.35 |
| 6,632,154 B2 | * | 10/2003 | Ushikoshi | ................... 475/338 |
| 7,007,565 B2 | * | 3/2006 | Allen et al. | .................... 74/333 |

FOREIGN PATENT DOCUMENTS

| | | | | |
|---|---|---|---|---|
| JP | 402031060 A | * | 2/1990 |
| JP | 2001-355700 | | 12/2001 |
| JP | 2002-37100 | | 2/2002 |
| WO | WO 00/23313 | | 4/2000 |

* cited by examiner

*Primary Examiner*—Richard W Ridley
*Assistant Examiner*—Matthew A Johnson
(74) *Attorney, Agent, or Firm*—Hamre, Schumann, Mueller & Larson, P.C.

(57) ABSTRACT

Worm gear mechanism includes a driving worm, a torque delivering worm wheel meshing with the worm, and an auxiliary worm wheel superimposed on the torque delivering worm wheel. The auxiliary worm wheel has a pitch diameter greater than that of the torque delivering worm wheel. The auxiliary worm wheel is biased against the driving worm wheel via a biasing member in the form of a leaf spring.

9 Claims, 18 Drawing Sheets

WORM GEAR MECHANISM AND ELECTRIC POWER STEERING APPARATUS EQUIPPED WITH THE WORM GEAR MECHANISM

FIELD OF THE INVENTION

The present invention relates to worm gear mechanisms and electric power steering apparatus equipped with such worm gear mechanisms.

BACKGROUND OF THE INVENTION

The worm gear mechanisms are transmission mechanisms which include a torque delivering worm wheel meshing with a driving worm so that torque can be transmitted from the worm via the worm wheel to a load side (i.e., load-side component). In the field of such worm gear mechanisms, various techniques have been developed for reducing undesired backlashes (see, for example, Japanese Patent Application Laid-open Publication Nos. 2001-355700 and 2002-37100). The worm gear mechanism disclosed in Japanese Patent Application Laid-open Publication No. 2001-355700 is outlined in FIGS. 17A-17C, and the worm gear mechanism disclosed in Japanese Patent Application Laid-open Publication No. 2002-37100 is outlined in FIGS. 18A and 18B.

FIG. 17A shows the worm gear mechanism 200 disclosed in the No. 2001-355700 publication, which is connected to an electric motor 201. FIG. 17B is a sectional view of the worm gear mechanism 200, and FIG. 17C shows how a worm 202 and worm wheel 204 mesh with each other in the worm gear mechanism 200.

In the worm gear mechanism 200, as shown in FIG. 17A, the driven worm wheel 204, connected to an output shaft 203, meshes with the driving worm 202 connected via a worm shaft 205 to the electric motor 201. As seen from FIGS. 17A to 17C, the worm wheel 204 includes a hub 206 fixedly mounted on the output shaft 203, and first and second gears 207 and 208 resiliently secured on the outer periphery of the hub 206 via a ring-shaped resilient member 209.

Namely, in the worm wheel 204 meshing with the worm 202, the two (first and second) gears 207 and 208 are divided or separated from each other, via the resilient member 209, along the axis of the output rotation shaft 203 in phase-shifted relation to each other, and the resilient member 209 allows the two gears 207 and 208 to be slightly rotated relative to each other in a rotational direction of the worm wheel 204 and then resiliently rotated back to their original relative rotational positions after the rotation. In this worm gear mechanism 200, a tooth 202a of the worm 200 is held at its opposite surfaces by opposed teeth 207a and 208a of the first and second gears 207 and 208, so as to minimize undesired backlashes.

FIG. 18A shows the worm gear mechanism 300 disclosed in the No. 2002-37100 publication, which is connected to an electric motor 301. FIG. 18B is a sectional view of the worm gear mechanism 300.

In the worm gear mechanism 300 of FIG. 18A, a driven worm wheel 304, connected to an output shaft 303, meshes with a driving worm 302 connected via a motor shaft 305 to the electric motor 301. As seen in FIG. 18B, each tooth 311 of the worm wheel 304 has a meshing region 312 (shaded portion in the figure) that meshes with a tooth 302a of the worm 302. The worm wheel 304 has an annular holding groove portion 313 that is formed in one side of the tooth width, i.e. face width, (extending in a left-and-right direction of FIG. 18B) of each tooth 311 and located outwardly of the meshing region 312 of each tooth 311, and a rubber O-ring 321 is fitted in the annular groove portion 313. The rubber O-ring 321 is slightly deformed by contacting a top land (i.e., tooth top surface) 302b of the worm 302, and its resilient restoring force imparts a preload to the meshing tooth regions to thereby reduce backlashes.

However, in the conventional worm gear mechanism 200 shown in FIGS. 17A to 17C, where the worm wheel 204 comprises the two gears 207 and 208 separated from each other along the axis of the rotation shaft, the area of contact, with the tooth 202a of the worm 202, of each tooth of the worm wheel 204 is less than one-half the contact area in the traditional worm wheel having an integral (i.e., non-divided) gear. When the worm 202 is rotated in a forward direction, the torque is transmitted from the worm tooth 202a to the teeth 207a of the first gear 207, while, when the worm 202 is rotated in a reverse direction, the torque is transmitted from the worm tooth 202a to the teeth 208a of the second gear 208. Particularly, the region where the first and second gears 207 and 208 are separated from each other (i.e., the middle portion of the width of the worm wheel 204 in the illustrated example of FIG. 17B) is just where contact pressure, against the worm 202, of the worm wheel 204 becomes greatest. Therefore, further consideration or improvement has to be made to achieve an enhanced durability, wear resistance in particular, of the worm gear mechanism 200.

Further, in the conventional worm gear mechanism 300 of FIGS. 18A and 18B, where the annular holding groove portion 313 is formed only in one side of the face width of each tooth 311 and located outwardly of the meshing region 312 of each tooth 311 of the worm wheel 304, bending rigidity in a tooth-thickness direction would differ between the opposite sides of the face width, which would undesirably make the contact pressure uneven between the opposite sides of the face width. Therefore, with this worm gear mechanism 300 too, further consideration or improvement has to be made for an enhanced durability.

Besides, in the worm gear mechanism 300 of FIGS. 18A and 18B, considerable frictional force is produced by the rubber O-ring 321 held in rubbing contact with the top land (i.e., tooth top surface) 302b of the rotating worm 302. In addition, the worm wheel 304 has a relatively great radius from its rotation center line (or rotation axis) to the rubbing contact surface of the rubber O-ring 321. Therefore, there would be produced a great friction torque. It is preferable that such a great friction torque be minimized in order to enhance a torque transmitting efficiency of the worm gear mechanism 300. Further, because the rubber O-ring 321 frequently rubs the tooth top surface 302b, further consideration or improvement has to be made to secure an enhanced durability of the O-ring 321.

In cases where the worm gear mechanism 200 of FIGS. 17A to 17C or the worm gear mechanism 300 of FIGS. 18A and 18B is employed in an electric power steering apparatus, it is also required to minimize impinging or hitting sound that would be produced between the gear teeth as the steering wheel is operated by a vehicle driver, so as to minimize noise sound in a vehicle compartment.

Furthermore, because, as well known, the electric power steering apparatus is constructed to add steering assist torque of the electric motor to a steering system via the worm gear mechanism 200 or 300, it is highly preferable to eliminate the backlashes in order to achieve an enhanced steering feel; this is because of the fact that, when the steering wheel is turned in a given direction, presence of the backlash would undesirably delay (i.e., result in a time delay in) the steering assist torque transmission from the worm gear mechanism 200 or 300 to the steering system.

SUMMARY OF THE INVENTION

In view of the foregoing, it is an object of the present invention to provide a technique which can reduce hitting sound between the teeth of the worm and worm wheel, which can enhance durability of the worm gear mechanism and which can maintain appropriate meshing between the worm and the worm wheel.

According to one aspect of the present invention, there is provided a worm gear mechanism, which comprises: a driving worm; a torque delivering worm wheel meshing with the worm for transmitting torque from the worm to a load side; an auxiliary worm wheel superimposed on the torque delivering worm wheel and meshing with the worm, the auxiliary worm wheel having a pitch diameter greater than that of the torque delivering worm wheel; and a biasing member for normally biasing the auxiliary worm wheel against the driving worm.

In the present invention, the pitch diameter of the auxiliary worm wheel is set greater than the pitch diameter of the torque delivering worm wheel. Thus, the auxiliary worm wheel meshes with the worm with a different meshing phase from the torque delivering worm wheel. As a consequence, the torque delivering worm wheel can be set to a sufficiently great face width. Therefore, the tooth of the torque delivering worm wheel can have a sufficient area of contact with the tooth of the worm, and thus, the worm gear mechanism, having an unwanted backlash removed therefrom, can have an enhanced durability. With the unwanted backlash removed, the worm gear mechanism of the present invention can effectively prevent production of hitting sound between the teeth of the worm and the torque delivering worm wheel.

Further, in the present invention, the face width (tooth width) of the torque delivering worm wheel can be located symmetrically about a meshing region where the torque delivering worm wheel meshes with the worm, when the worm is viewed in its axial direction. Furthermore, the torque delivering worm wheel can be integrally formed, without a need for forming, in each tooth, a groove for retaining a backlash-preventing component as conventionally done in the known worm gear mechanism. As a result, the teeth of the torque delivering worm wheel can be formed with an enhanced accuracy, and the torque delivering worm wheel can be maintained in good meshing engagement with the worm.

Furthermore, with the arrangements that the auxiliary worm wheel is superimposed on the torque delivering worm wheel worm and the auxiliary worm wheel is normally biased, via the biasing member, against the worm, it is possible to eliminate an unwanted backlash between the teeth of the worm and auxiliary worm wheel. Thus, as the worm rotates, the auxiliary worm wheel is rotationally displaced ahead of the torque delivering worm wheel. Namely, while the auxiliary worm wheel is being rotationally displaced by the worm, the torque delivering worm wheel worm can be rotated by the worm a little later than (i.e., with a slight time delay from) the rotational displacement of the auxiliary worm wheel. Consequently, the tooth of the worm can be gently brought into contact with the tooth of the torque delivering worm wheel, and thus, the durability of the worm gear mechanism can be enhanced even further. In addition, it is possible to even further prevent production of hitting sound between the teeth of the worm and the torque delivering worm wheel.

For example, in a case where a central portion of the auxiliary worm wheel is attached to the torque delivering worm wheel against rotation of the former relative to the latter, and when the rotational force of the worm is delivered to the auxiliary worm wheel, the auxiliary worm wheel is subjected to a component force, corresponding to a pressure angle of the worm tooth, such that the tooth top of the auxiliary worm wheel is displaced radially outwardly of the worm. With such a component force, the auxiliary worm wheel is also displaced, against the biasing of the biasing member, away from the torque delivering worm wheel; in this case, the biasing force of the biasing member serves as a resistance to the above-mentioned component force. Thus, while displacing the auxiliary worm wheel radially outwardly away from the torque delivering worm wheel against the resistance by the biasing member, the worm can cause the torque delivering worm wheel to start rotating a little later than the displacement of the auxiliary worm wheel. Consequently, the tooth of the worm can be gently brought into contact with the tooth of the torque delivering worm wheel. Thus, the durability of the worm gear mechanism can be enhanced even further. In addition, because the backlash can be removed, it is possible to even further prevent production of hitting sound between the teeth of the worm and torque delivering worm wheel.

Thus, with the simple arrangements that the auxiliary worm wheel is superimposed on and biased against the worm via the biasing member, the present invention can eliminate the backlash between the teeth of the worm and auxiliary worm wheel to thereby greatly enhance the durability of the worm gear mechanism, and can also efficiently prevent production of hitting sound between the teeth of the worm and the torque delivering worm wheel.

In an embodiment, the biasing member comprises a disk-shaped leaf spring (which may also be a coned disk spring) fixed in the auxiliary worm wheel and supported by the torque delivering worm wheel. Therefore, the number of the necessary component parts in the worm gear mechanism can be significantly reduced. In addition, because the biasing member is a leaf spring, it can be readily fixed in the auxiliary worm wheel.

In an embodiment, at least one of the biasing member and the torque delivering worm wheel has a projecting abutment section integrally formed at a predetermined position thereof for contact with a surface, opposed thereto, of the other of the biasing member and the torque delivering worm wheel. Because the projecting abutment section can impart a preload to the biasing member, the auxiliary worm wheel can be kept attached to the torque delivering worm wheel in a stable manner. In this way, the present invention can more effectively prevent generation of hitting sound between the teeth of the worm and auxiliary worm wheel and between the teeth of the worm and torque delivering worm wheel.

In an embodiment, the auxiliary worm wheel is a resin molding that has the leaf spring integrally molded therewith. Thus, it is possible to eliminate the possibility of an assembly error, misalignment between the axes of the leaf spring and auxiliary worm wheel, and thereby prevent erroneous meshing between the worm and the auxiliary worm wheel resulting from the misalignment. Further, in the present invention thus arranged, no particular fastening member, such as a bolt or rivet, is necessary for fixing the leaf spring in the auxiliary worm wheel, and thus the auxiliary worm wheel can be reduced in weight. Furthermore, because the resin-made auxiliary worm wheel is small in weight, the overall mass of the resin-made auxiliary worm wheel with the flat leaf spring fixed therein can be reduced. The reduced mass can reduce the inertia of the auxiliary worm wheel, and the reduced inertia can in turn reduce an impact applied from the auxiliary worm wheel to the leaf spring when the worm wheel has started rotating. Consequently, stress applied to the leaf spring can be reduced, and thus, the leaf spring can be further reduced in weight by, for example, reducing the thickness of the leaf spring. With the reduced overall mass of the auxiliary worm wheel having the flat leaf spring fixed therein, a steering feel of a vehicular electric power steering apparatus, where the worm gear mechanism of the present invention is employed, can be effectively improved because the worm gear mechanism permits improved responsiveness at the beginning of driver's turning operation of the steering wheel.

In an embodiment, the worm gear mechanism further comprises a rotation preventing mechanism for preventing rotational displacement of the auxiliary worm wheel relative to the torque delivering worm wheel. In the case where the central portion of the auxiliary worm wheel is attached to the torque delivering worm wheel with the rotation preventing mechanism, the auxiliary worm wheel can be readily positioned and assembled to the torque delivering worm wheel with an increased ease and reliability. Further, in the case where the worm gear mechanism of the present invention is applied to the vehicular electric power steering apparatus, the appropriate relative positional relationship of the auxiliary worm wheel to the torque delivering worm wheel can be maintained reliably despite an impact acting on the worm gear mechanism due to a reaction force from a road surface, aging (i.e., aged deterioration) of the mechanism, etc. Further, in a case where the auxiliary worm wheel is mounted in such a manner that it can slidingly rotate relative to the torque delivering worm wheel, the range of the relative rotation may be controlled via the rotation preventing mechanism; in this case, the rotational timing relationship between the torque delivering worm wheel and auxiliary worm wheel can be maintained with an increased reliability According to another aspect of the present invention, there is provided an electric power steering apparatus, which comprises: the worm gear mechanism arranged in the above-discussed manner; a steering system extending from a steering wheel of a vehicle to a steerable wheel; and an electric motor for generating torque and delivering the generated torque to the steering system via the worm gear mechanism. With the unwanted backlash effectively removed in the war gear mechanism as noted above, the worm gear mechanism employed in the steering apparatus of the present invention can have an enhanced durability. Also, it is possible to effectively prevent production of hitting sound between the meshing teeth when the steering wheel is turned, as a result of noise sound in the vehicle compartment can be effectively reduced. Furthermore, with the unwanted backlash effectively removed in the war gear mechanism, the torque delivering worm wheel can be maintained in good meshing with the worm. Thus, when the steering has been turned, it is possible to minimize a time delay with which steering assist torque is delivered from the worm gear mechanism to the steering system. Moreover, with the unwanted backlash removed, the worm and torque delivering worm wheel can be gently brought into meshing engagement without the respective teeth hitting or colliding against each other, so that turning operation of the steering wheel can be performed in a more appropriate manner. As a result, it is possible to even further enhance the steering feel of the electric power steering apparatus.

BRIEF DESCRIPTION OF THE DRAWINGS

Certain preferred embodiments of the present invention will be described in detail below, by way of example only, with reference to the accompanying drawings, in which.

Figure 8:
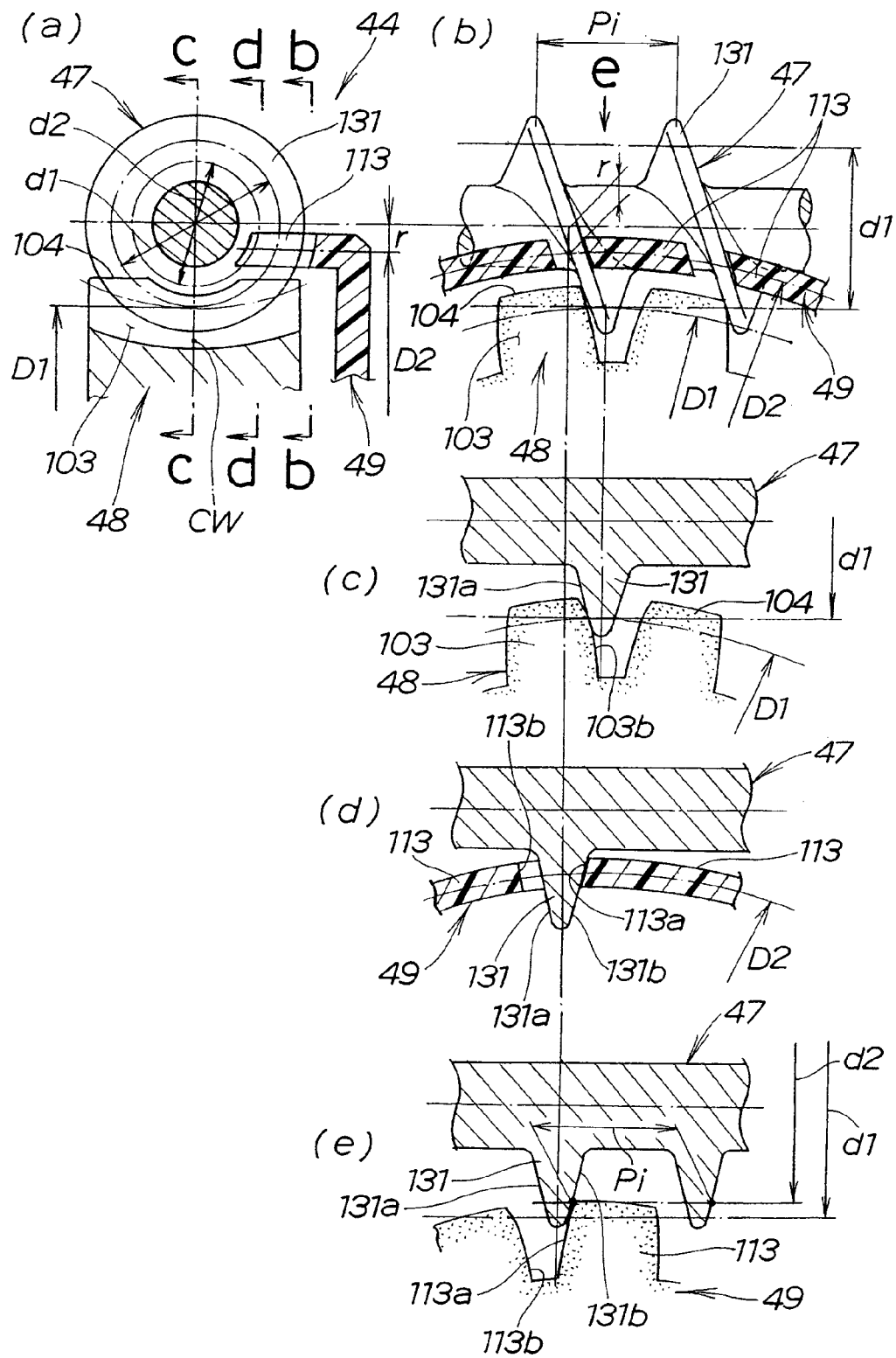
Figure 9:
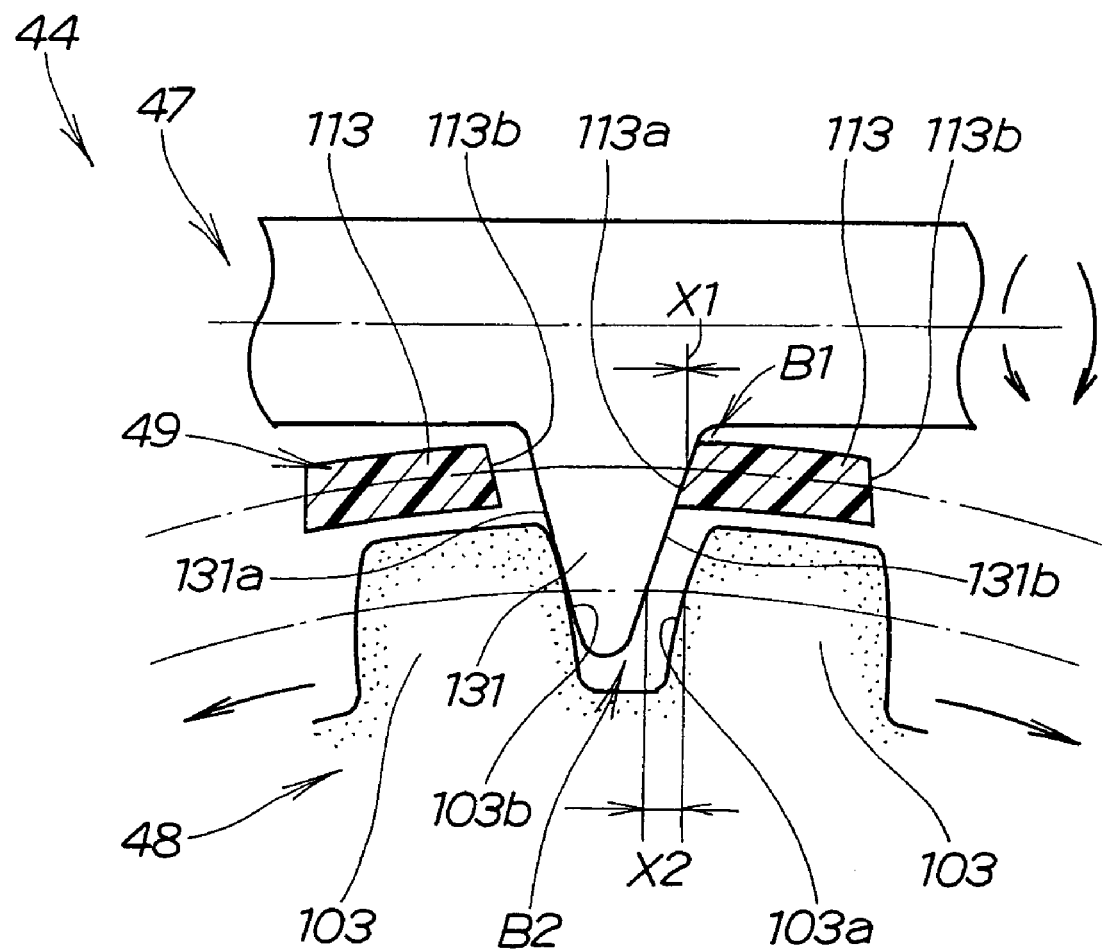
Figure 10:
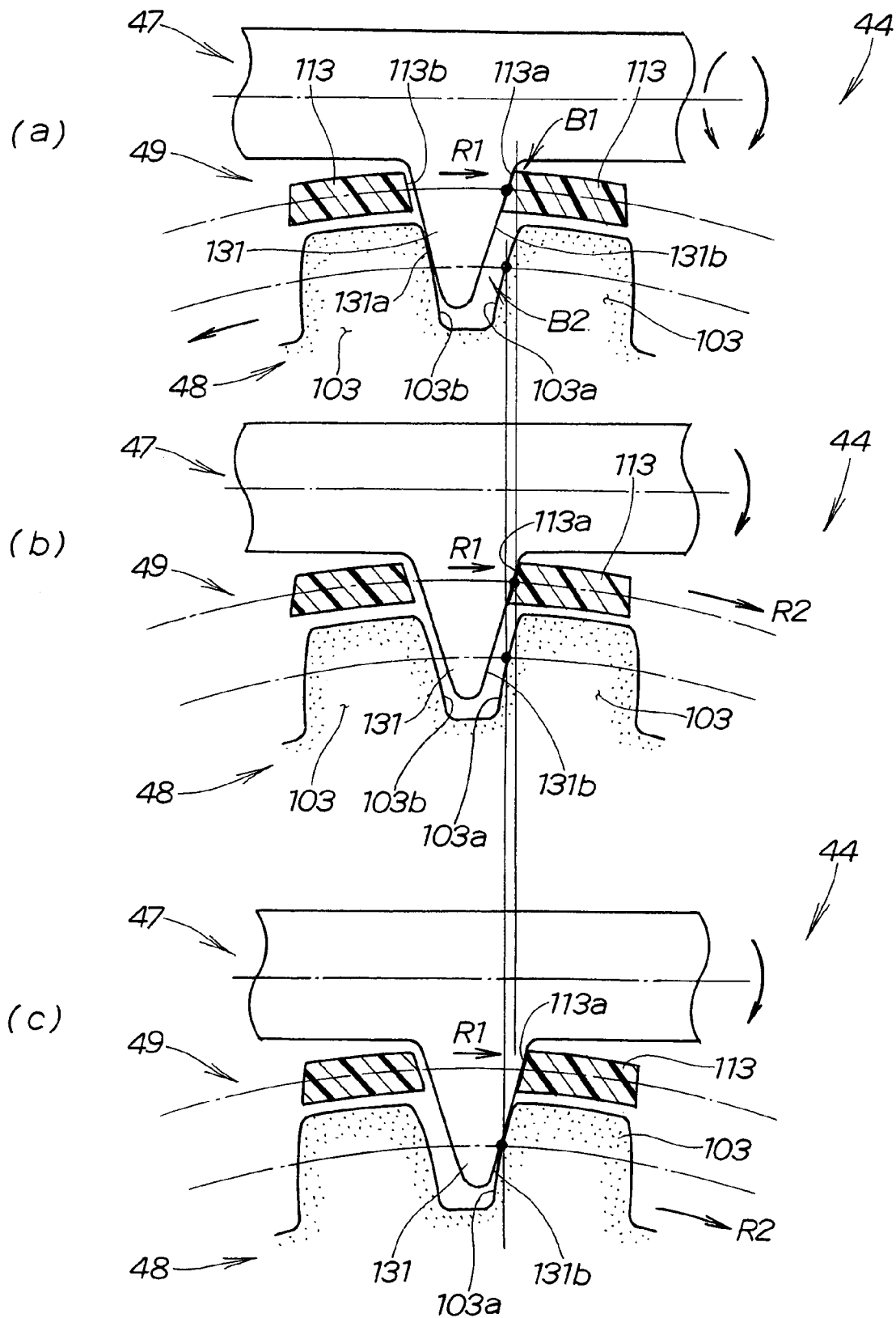
Figure 11:
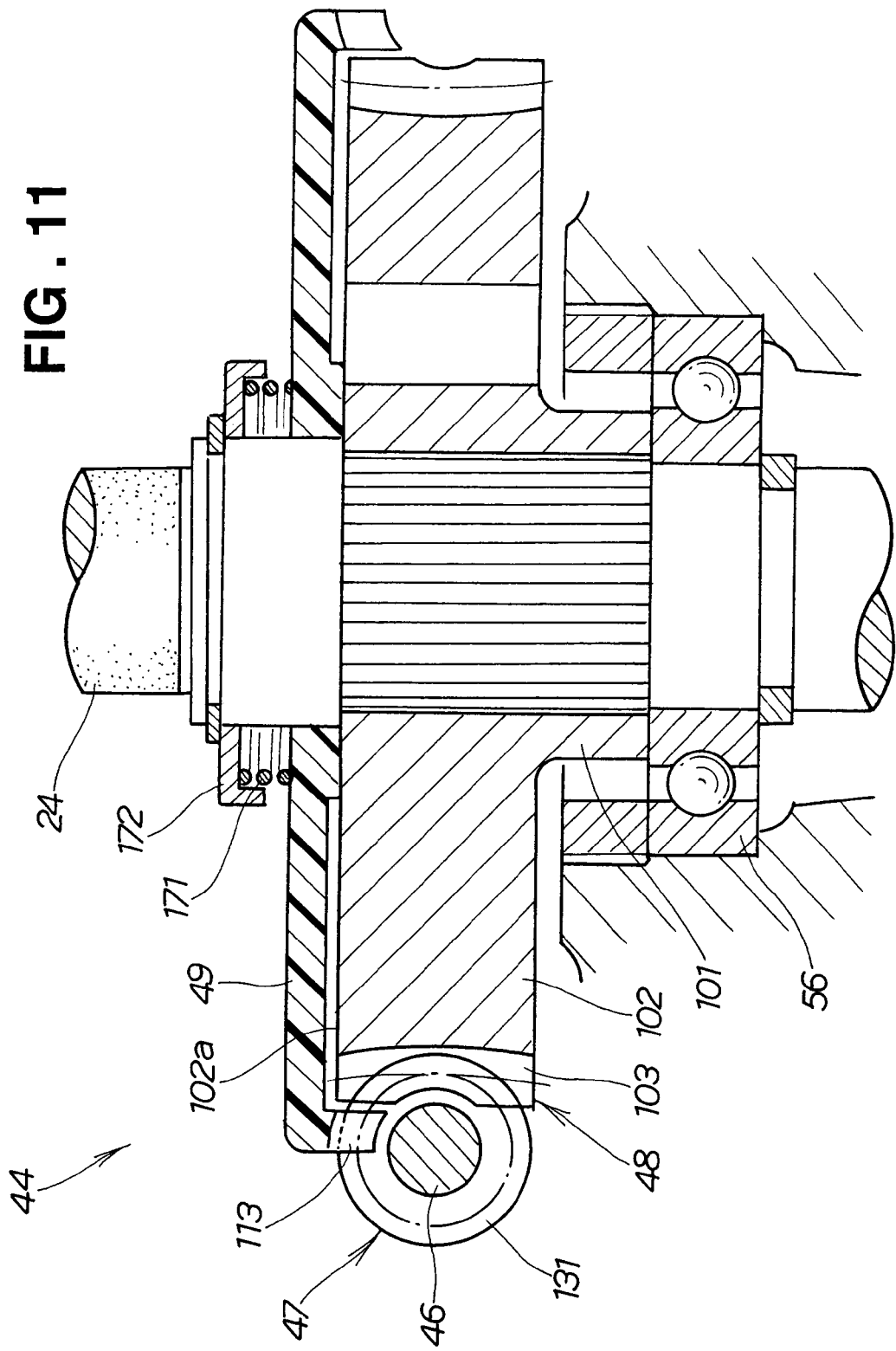
Figure 12:
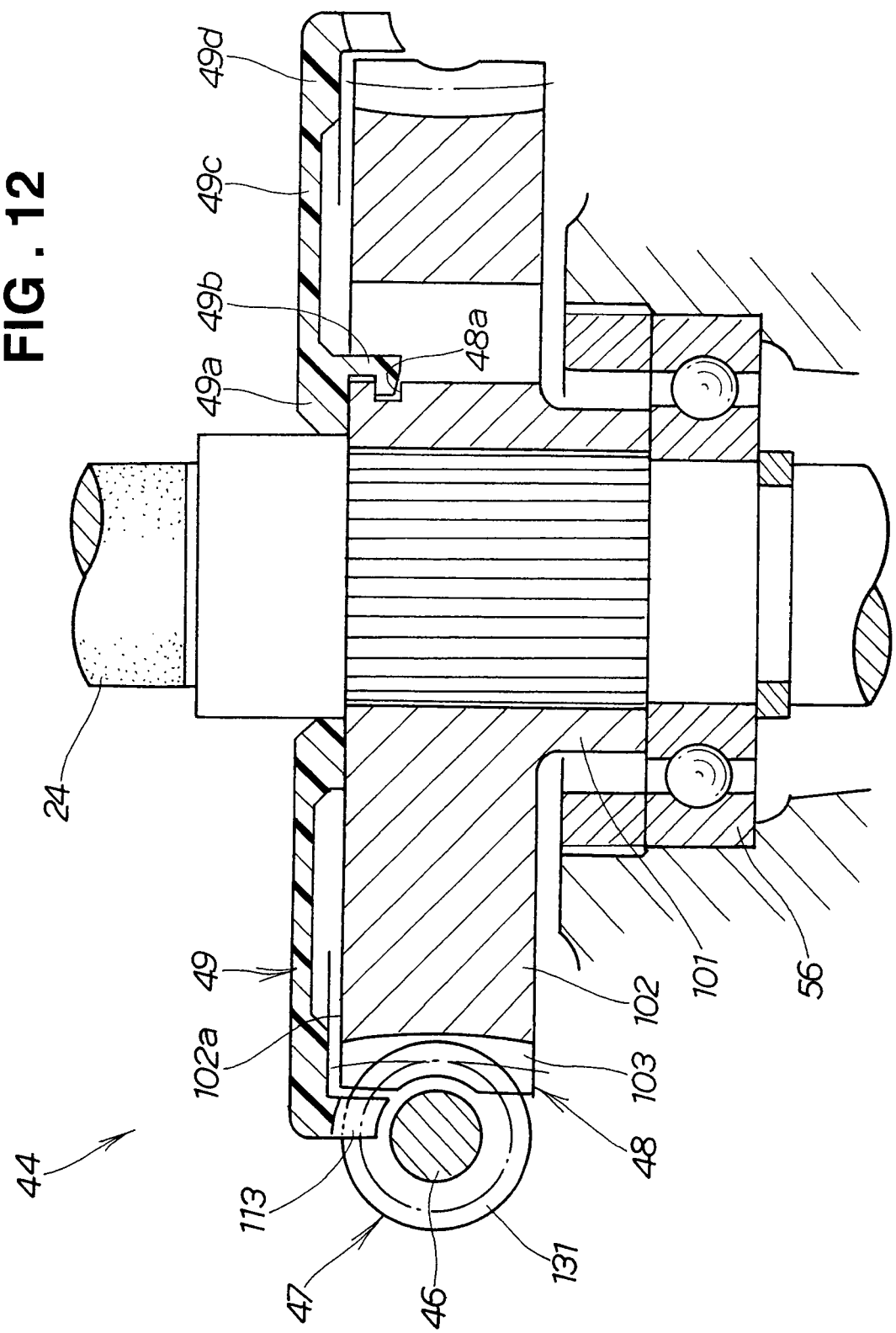
Figure 13:
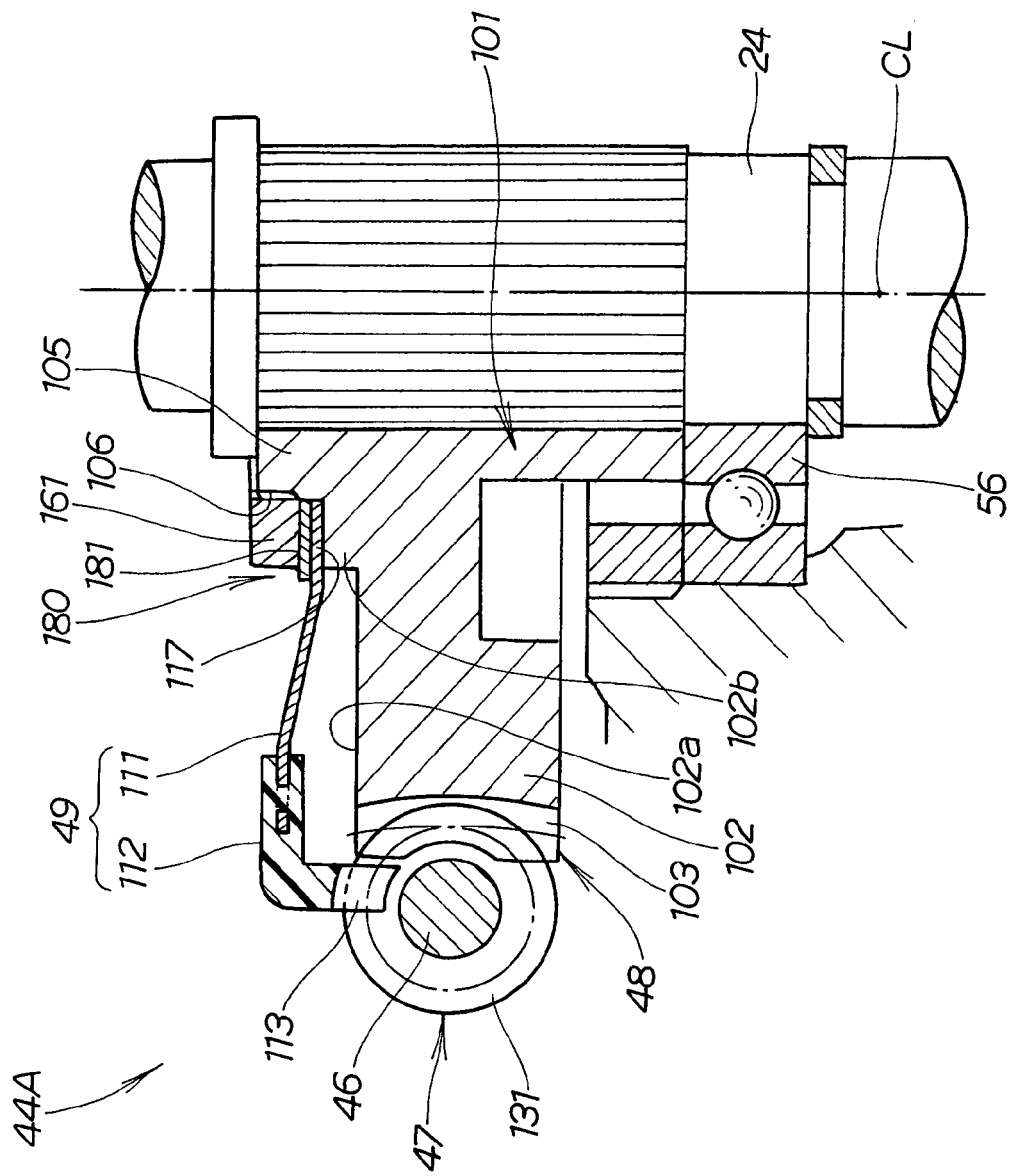
Figure 14:
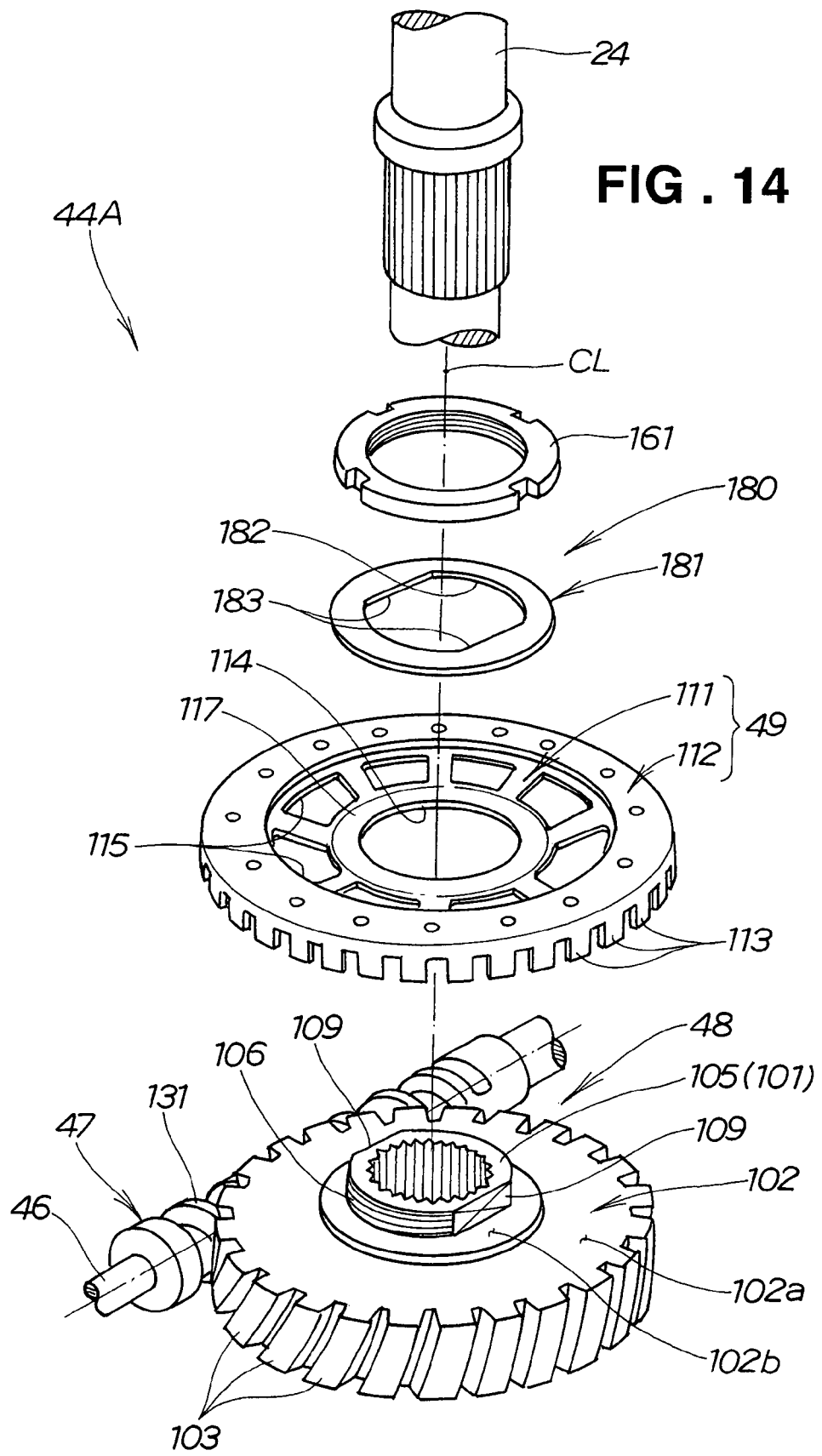
Figure 15:
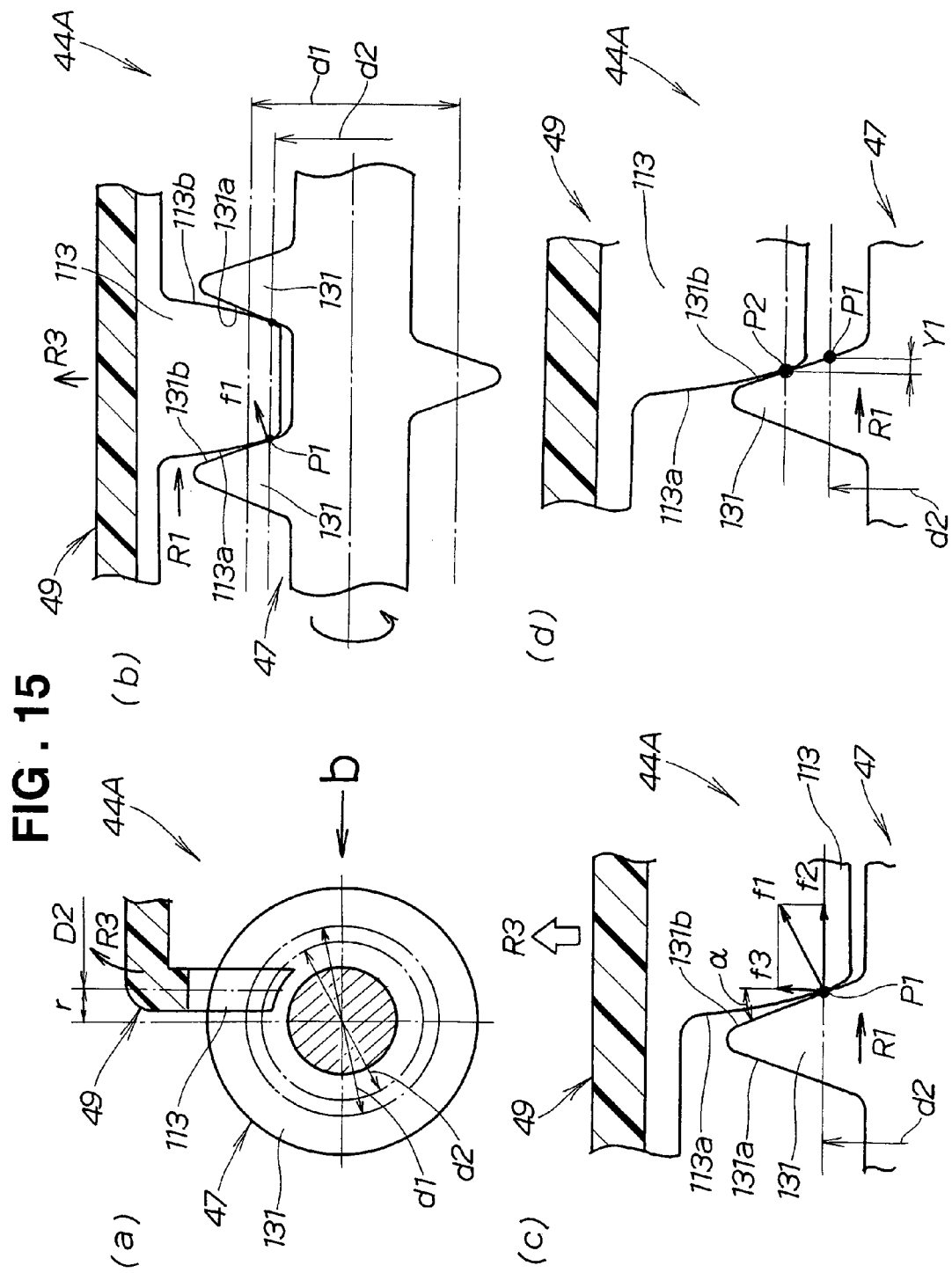
Figure 16:
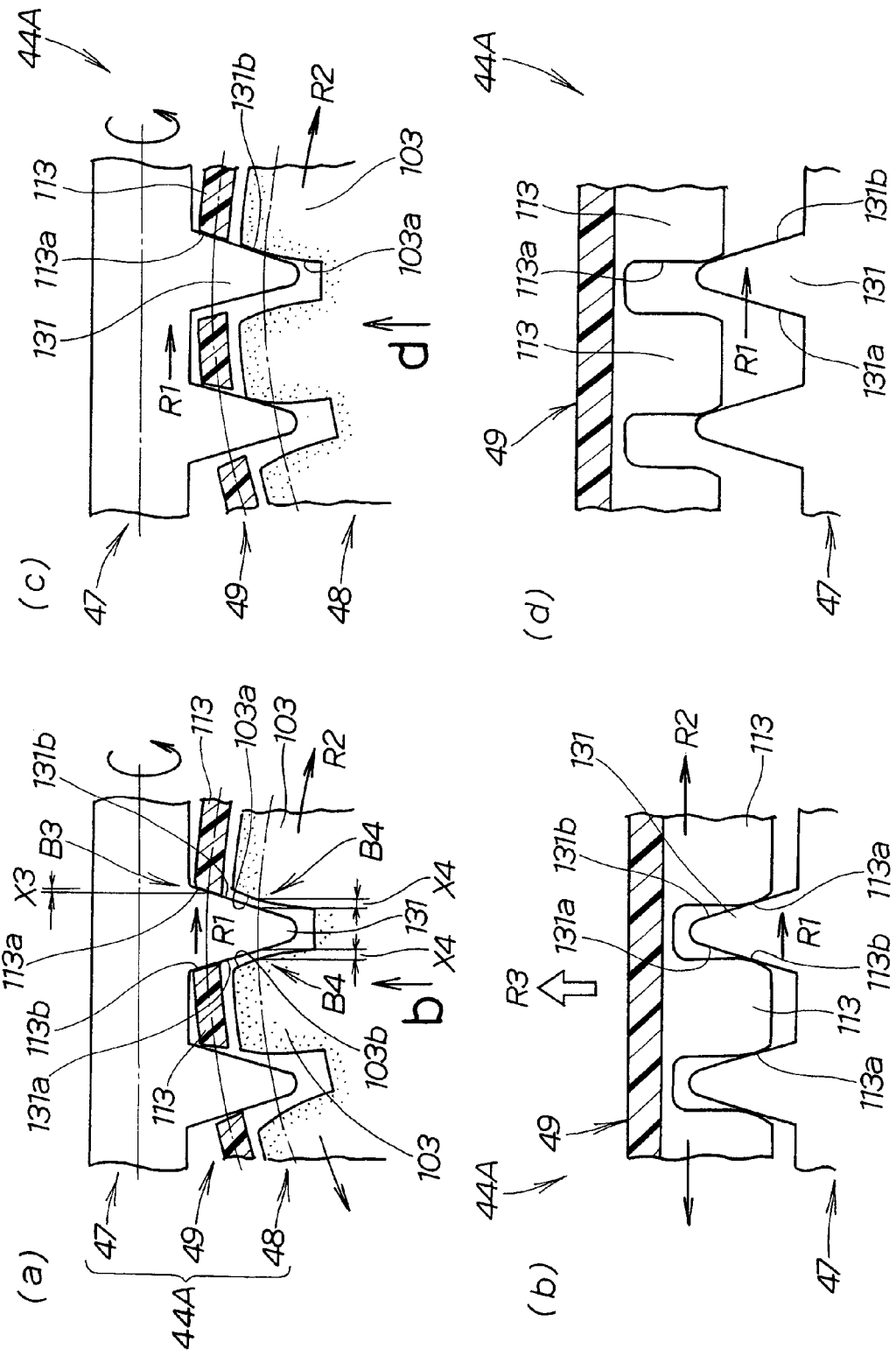
Figure 17A:
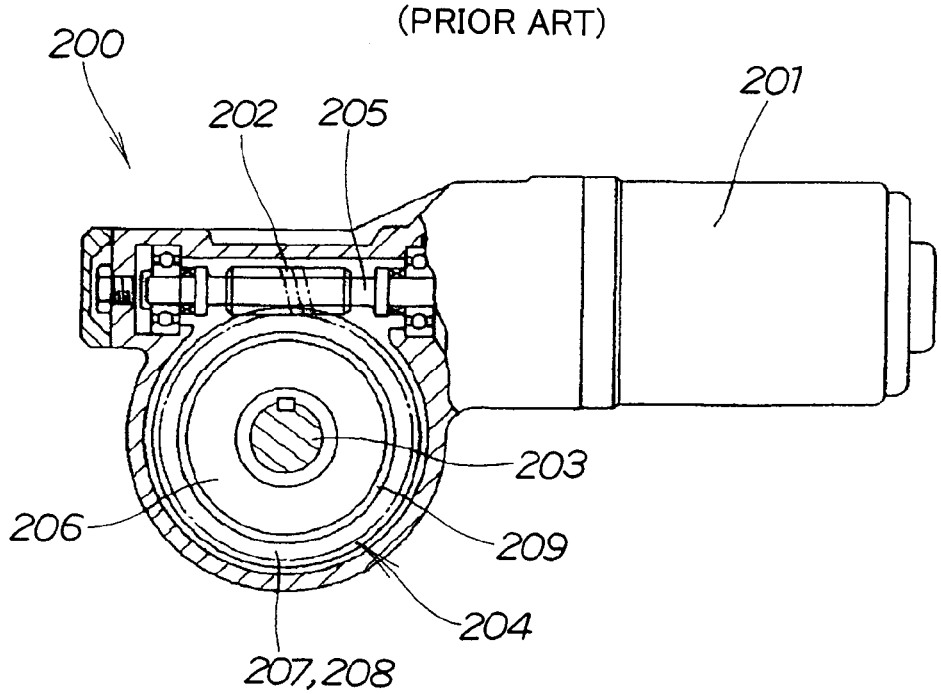
Figure 17B:
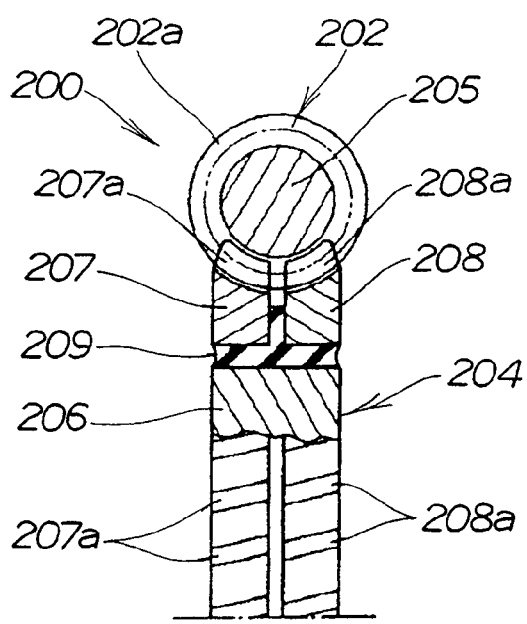
Figure 17C:
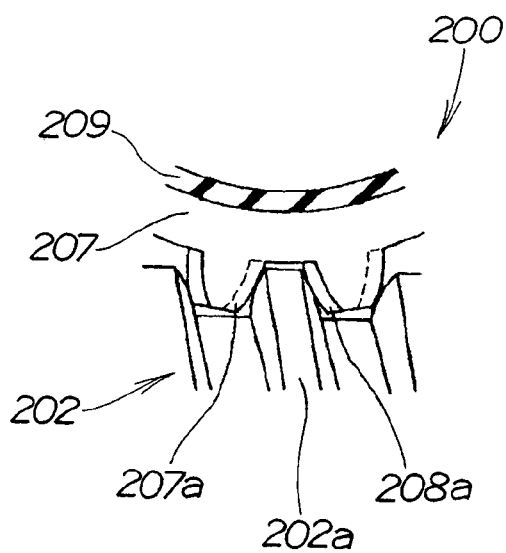
Figure 18A:
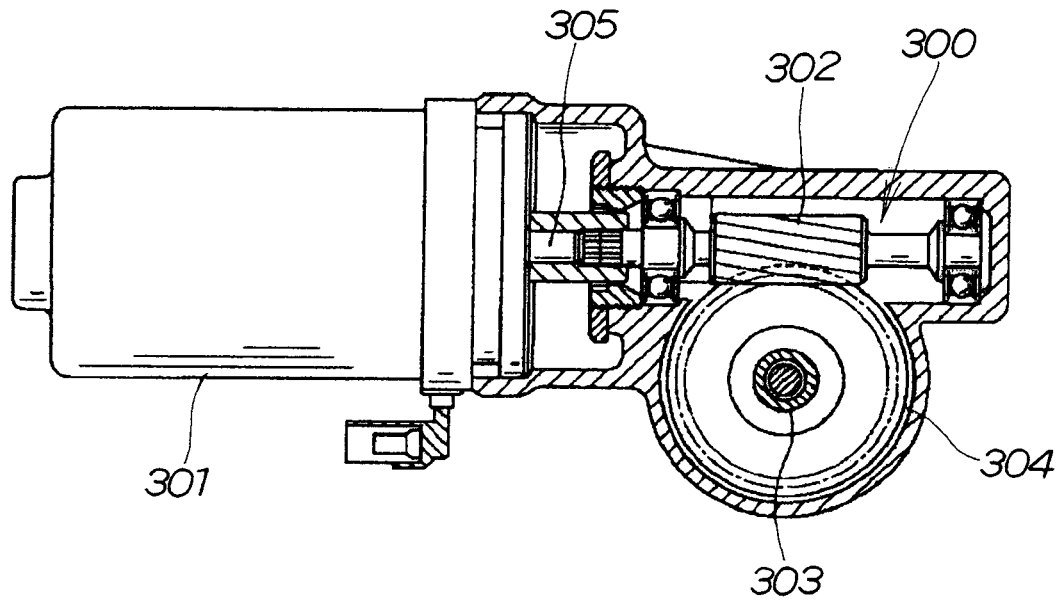
Figure 18B:
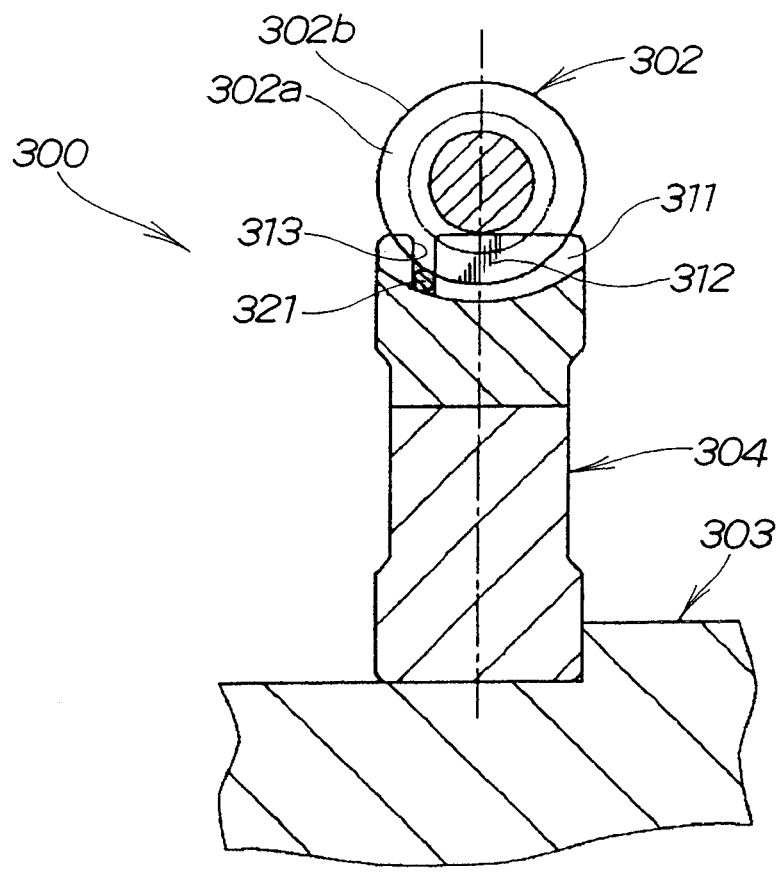

Sections (a)-(e) of FIG. 8 are sectional views showing meshing relationship among respective teeth of a worm, torque delivering worm wheel and auxiliary worm wheel in the first embodiment of the worm gear mechanism;

Sections (a)-(c) of FIG. 9 are sectional views showing meshing relationship among the teeth of the worm, torque delivering worm wheel and auxiliary worm wheel in the first embodiment of the worm gear mechanism;

Sections (a)-(c) of FIG. 10 are views explanatory of behavior of the first embodiment of the worm gear mechanism;

FIG. 11 is a sectional view of a first modification of the worm gear mechanism;

FIG. 12 is a sectional view of a second modification of the worm gear mechanism;

FIG. 13 is a sectional view showing a second embodiment of the worm gear mechanism;

FIG. 14 is an exploded view of the second embodiment of the worm gear mechanism;

Sections (a)-(d) of FIG. 15 are views explanatory of how the worm and auxiliary worm wheel mesh with each other in the second embodiment of the worm gear mechanism and also explanatory of behavior of the second embodiment;

Sections (a)-(d) of FIG. 16 are views explanatory of how the worm, torque delivering worm wheel and auxiliary worm wheel mesh with one another in the second embodiment of the worm gear mechanism and also explanatory of behavior of the second embodiment;

FIGS. 17A to 17C are views outlining a first example of a conventionally-known worm gear mechanism; and FIGS. 18A and 18B are views outlining a second example of a conventionally-known worm gear mechanism.

DETAILED DESCRIPTION OF THE PREFERRED EMBODIMENTS

Now, a description will be given about an electric power steering apparatus equipped with a worm gear mechanism of the present invention.

FIGS. 1 to 10 show the electric power steering apparatus and a first embodiment of the worm gear mechanism employed in the electric power steering apparatus.

Figure 1:
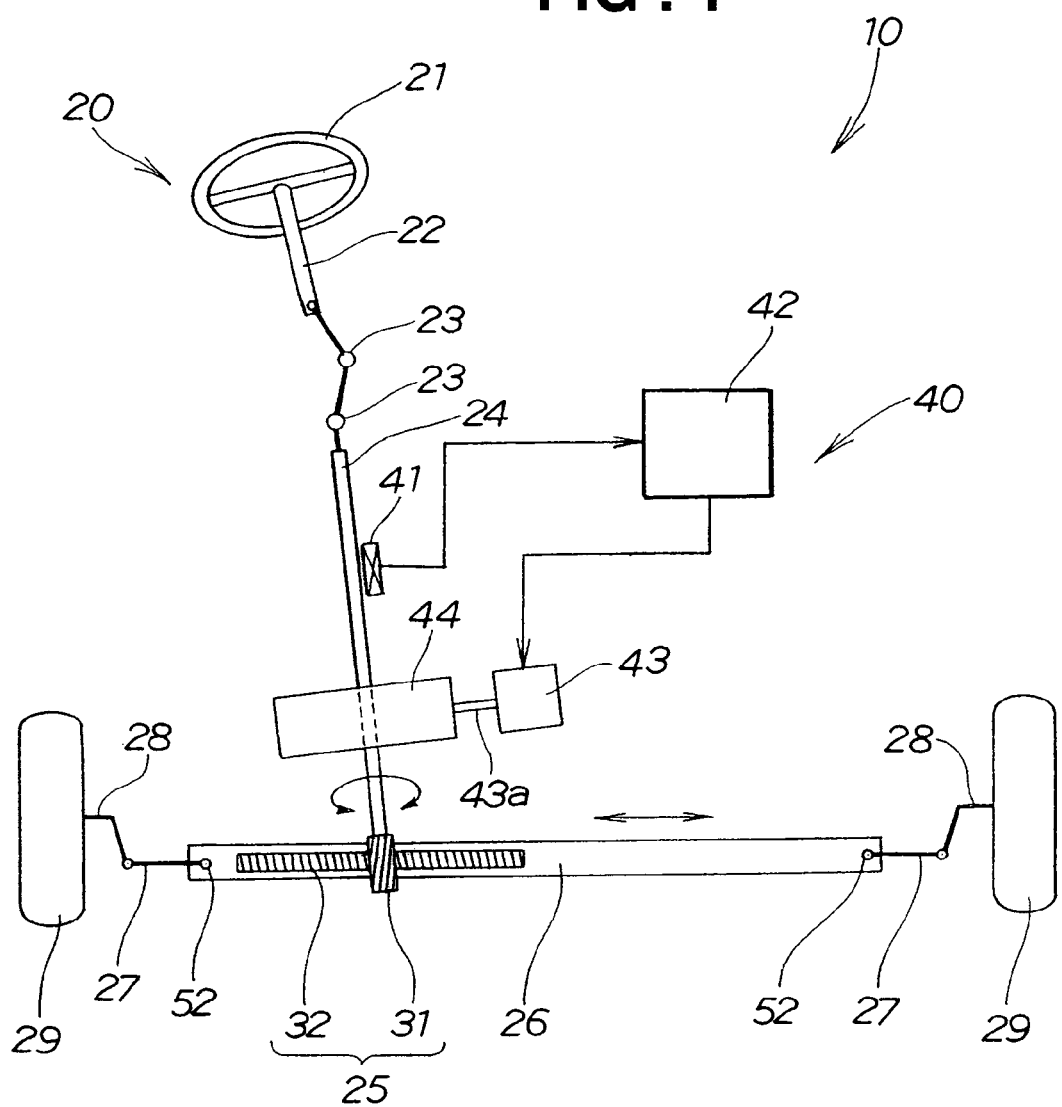
FIG. 1 is a schematic view showing a general setup of an electric power steering apparatus in accordance with a first embodiment of the present invention.

The electric power steering apparatus 10 schematically shown in FIG. 1 generally comprises a steering system 20 extending from a vehicle steering wheel 21 to steerable road wheels (in the illustrated example, left and right front road wheels) 29 of the vehicle, and a steering assist torque mechanism 40 for supplying steering assist torque to the steeling system 20.

In the steering system 20, a pinion shaft (input shaft) 24 is coupled to the steering wheel 21 via a steering shaft 22 and universal joints 23, and a rack shaft 26 is coupled to the pinion shaft 24 via a rack-and-pinion mechanism 25. Further, the left and right steerable road wheels 29 are coupled to opposite ends of the rack shaft 26 via left and right tie rods 27 and knuckle arms 28. The rack-and-pinion mechanism 25 includes a pinion 31 formed on the pinion shaft 24 and a rack 32 formed on the rack shaft 26.

By a human operator or driver of the vehicle operating the steering wheel 21, steering torque is delivered from the steering wheel 21 to the left and right steerable road wheels 29 via the rack-and-pinion mechanism 25, left and right tie rods 27 etc. and thereby steers the road wheels 29.

The steeling assist torque mechanism 40 includes a steering torque sensor 41 for detecting steeling torque applied by the driver to the steeling system 20 through operation of the steering wheel 21, a control unit 42 for generating a control signal on the basis of the detected steering torque, an electric motor 43 for generating steering assist torque corresponding to the driver-applied steering torque on the basis of the control signal from the control unit 42, and the worm gear mechanism 44 for transmitting the motor-generated steering assist torque from the motor 43 to the pinion shaft 24. The steering assist torque thus transmitted to the pinion shaft 24 is further transmitted to the rack-and-pinion mechanism 25.

The left and right steerable road wheels 29 are steered by a combination of (i.e., composite torque composed of) the driver-applied steering torque and motor-generated steering assist torque via the rack shaft 26.

Figure 2:
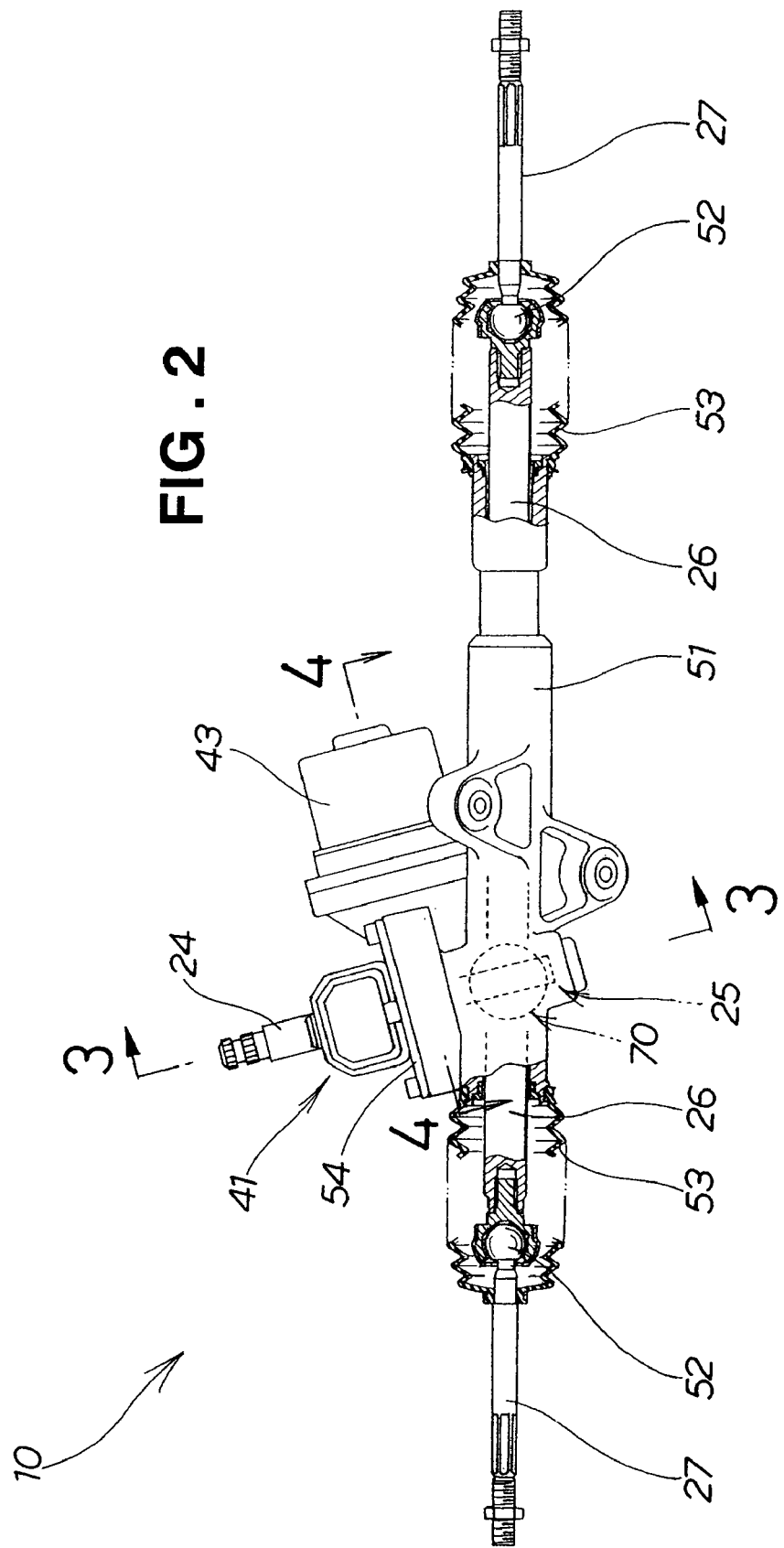
FIG. 2 is a view showing details of a pinion shaft, rack shaft and other relevant components in the electric power steering apparatus shown in FIG. 1.

FIG. 2 shows details of the pinion shaft 24, rack shaft 26 and other relevant components of the electric power steering apparatus. The rack shaft 26 is accommodated in a housing 51 extending in a widthwise direction of the vehicle (left-and-right direction in FIG. 2), and the rack shaft 26 is slidable axially within the housing 51. The tie rods 27 are coupled, via ball joints 52, to the axial opposite ends of the rack shaft 26 projecting outwardly from the housing 51. Reference numeral 53 represents a dust seal boot.

Figure 3:
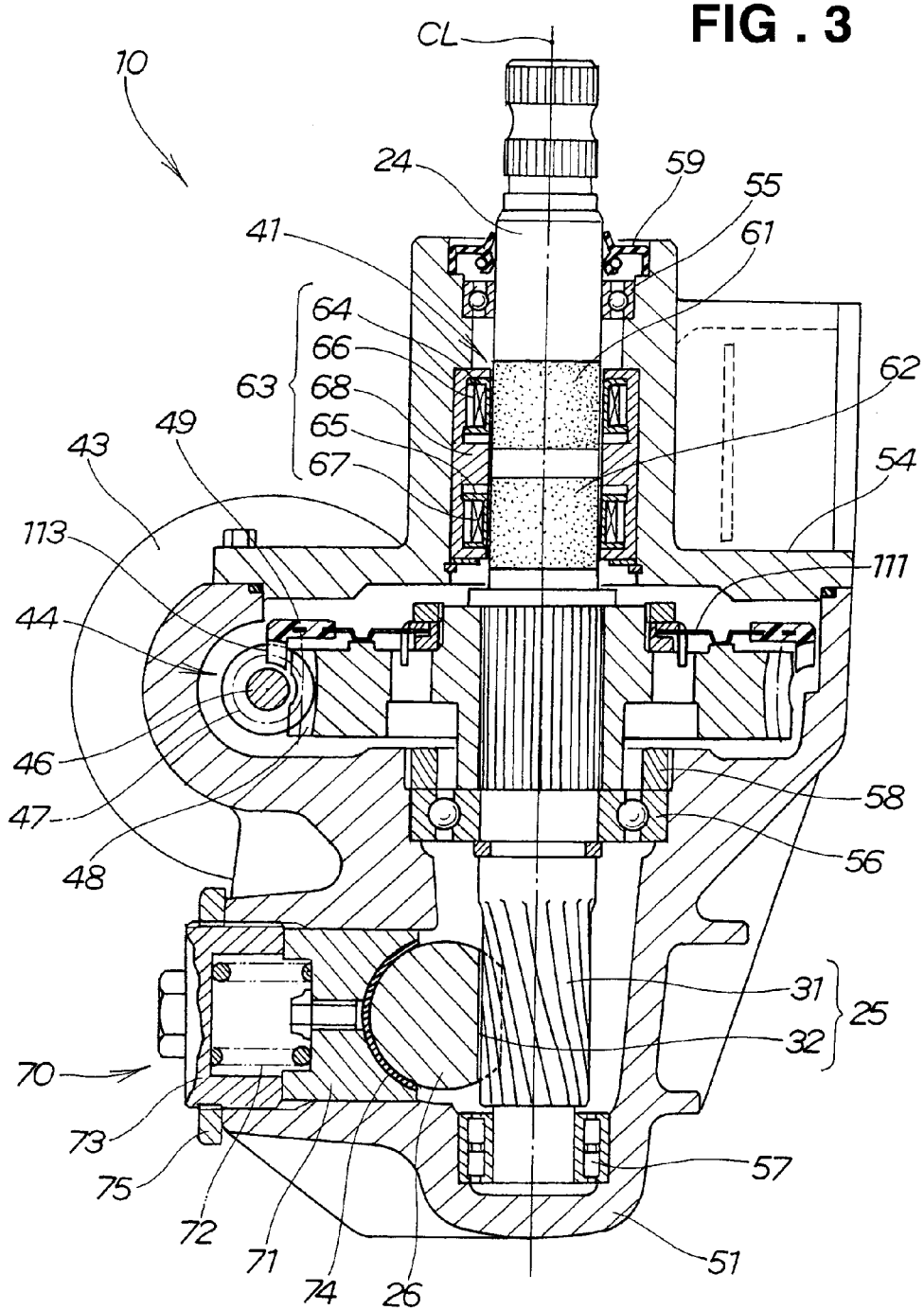
FIG. 3 is an enlarged sectional view taken along line 3-3 of FIG. 2.

FIG. 3 is an enlarged sectional view taken along line 3-3 of FIG. 2, which shows a vertical sectional structure of the electric power steering apparatus 10. The pinion shaft 24, rack-and-pinion mechanism 25, steering torque sensor 41 and worm gear mechanism 44 are together accommodated in the housing 51. The housing 51 has an upper opening normally closed with an upper cover 54. The steering torque sensor 41 is attached to the upper cover 54.

The worm gear mechanism 44 includes a torque delivering worm wheel 48 meshing with a driving worm 47 so as to transmit torque from the driving worm 47 to a load side. The worm gear mechanism 44 also includes an auxiliary worm wheel 49.

The vertically-extending pinion shaft 24 is rotatably supported, at its upper end portion, longitudinally-middle portion and lower end portion, by the housing 51 by means of three bearings 55, 56 and 57. The electric motor 43 and rack guide 70 are secured to the housing 51. Reference numeral 58 represents a lock nut for positioning the bearing 56 relative to the housing 51, and 59 an oil seal for sealing the pinion shaft 24.

The steering torque sensor 41 is in the form of a magneto-strictive torque sensor mounted on the pinion shaft 24, which comprises first and second residual magnetostriction sections 61 and 62 and a detection section 63 that is disposed around the first and second residual magnetostriction sections 61 and 62 for electrically detecting a magnetostrictive effect produced in the residual magnetostriction sections 61 and 62. The magnetostrictive effect detected by the detection section 63 is output as a torque signal.

The first and second residual magnetostriction sections 61 and 62 comprise magnetostrictive films imparted with residual magnetostrictions in opposite directions along the axis of the pinion shaft 24, and present magneto-strictive characteristics varying in response to torque acting on the magneto-strictive films.

The detection section 63 includes cylindrical coil bobbins 64 and 65 through which the pinion shaft 24 is passed, first and second multi-layer solenoid coils 66 and 67 wound on the corresponding coil bobbins 64 and 65, and a magnetic-shielding back yoke 68 surrounding the first and second multi-layer solenoid coils 66 and 67.

The rack guide 70 is a pressing means which includes a guide section 71 for supporting and guiding the rack shaft 26 along one side of the shaft 26 opposite from the rack 32, and an adjusting bolt 73 for pressing the guide section 71 by means of a compression spring 72. Between the guide section 71 and the adjusting bolt 73, there is formed a slight gap in a direction of adjustment of the adjusting bolt 73. The guide section 71 includes a support member 74 along which the back surface of the rack shaft 26 is caused to slide. Reference numeral 75 represents a lock nut for positioning the adjusting bolt 73 relative to the housing 51. Namely, the rack guide 70 supports the rack shaft 26 for axial sliding movement therealong. Further, the rack 32 is pressed against the pinion 31 with a preload imparted to the rack 32 by the guide section 71 being pressed with appropriate force via the compression spring 72.

Figure 4:
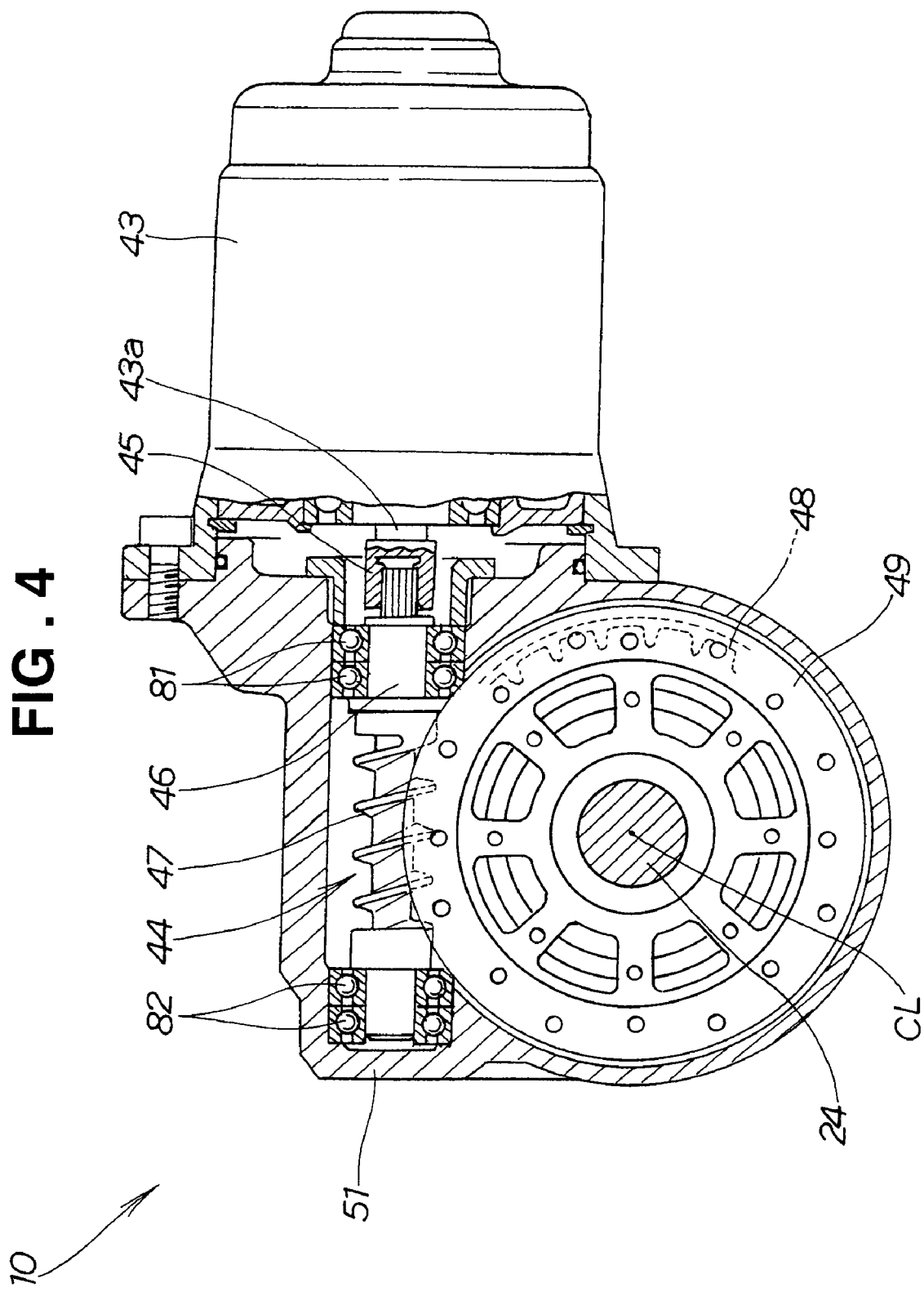
FIG. 4 is a sectional view taken along line 4-4 of FIG. 2.

FIG. 4 is a partly-sectional view taken along line 4-4 of FIG. 2, which shows relationship among the pinion shaft 24, motor 43 and worm gear mechanism 44. The motor 43 is attached to the housing 51 with its rotation shaft 43a oriented horizontally and extending into the housing 51. The worm gear mechanism 44 is an assist torque transmission mechanism, or torque assistor mechanism, for transmitting steering assist torque, generated by the motor 43, to the pinion shaft 24, as seen from FIGS. 3 and 4.

More specifically, the worm gear mechanism 44 includes a worm shaft 46 coupled via a coupling 45 to the rotation shaft 43a of the motor 43, the worm 47 integrally formed on the worm shaft 46, and the torque delivering worm wheel 48 meshing with the worm 47 and coupled to the pinion shaft 24. The horizontally-extending worm shaft 46 is rotatably supported at its axial opposite ends within the housing 51 via bearings 81 and 82.

Now, the first embodiment of the worm gear mechanism 44 will be detailed with reference to FIG. 5 that shows only a left half of the worm gear mechanism 44 in correspondence with FIG. 3.

Figure 5:
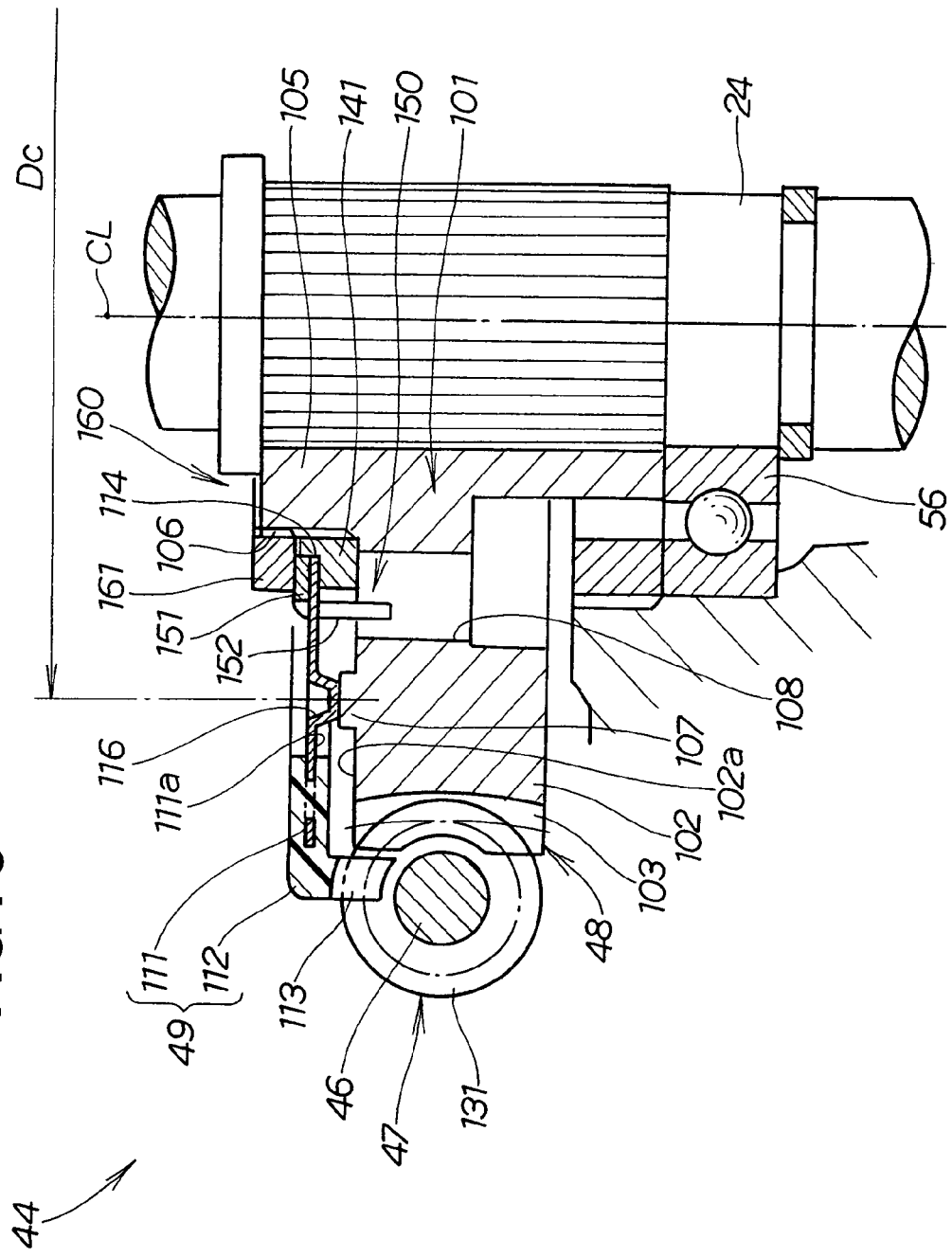
FIG. 5 is a sectional view of a first embodiment of a worm gear mechanism employed in the electric power steering apparatus.
Figure 6:
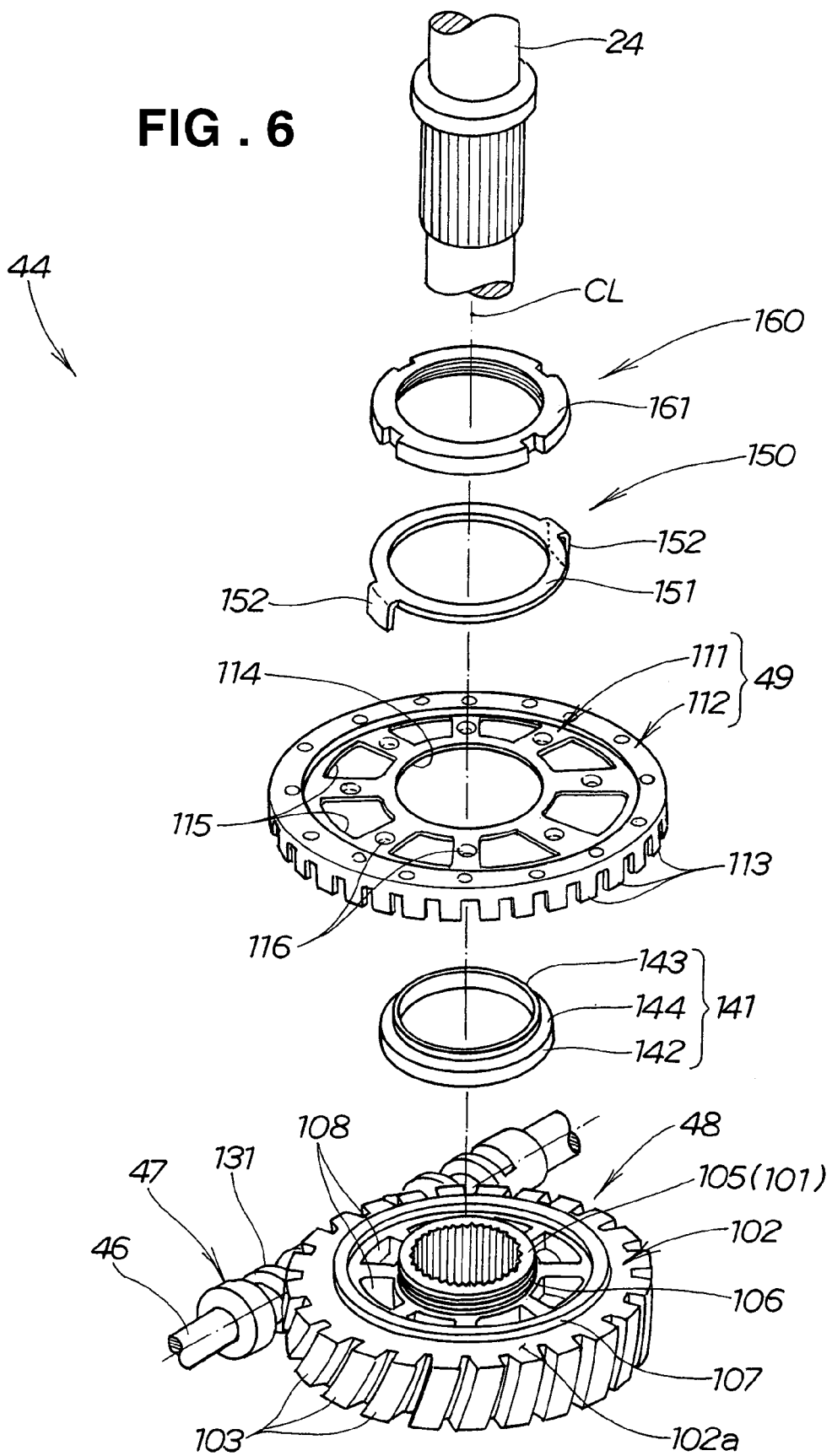
FIG. 6 is an exploded view of the worm gear mechanism of FIG. 5.

As seen in FIGS. 5 and 6, the torque delivering worm wheel 48 includes a cylindrical boss (hub) section 101 fitted over the pinion shaft 24, and a disk-shaped wheel body 102 formed integrally on the outer periphery of the boss section 101 having a plurality of teeth 103 integrally formed on its outer peripheral surface. The torque delivering worm wheel 48 is coupled to the pinion shaft 24 in such a manner that its movement along the axis of the pinion shaft 24 is prevented and that its rotation relative to the pinion shaft 24 is prevented via a spline or serration mechanism.

The boss section 101 has an extension portion 105 projecting upward, in the axial direction of the pinion shaft 24, from one or upper surface 102a of the wheel body 102, and a male (external) thread 106 is formed on the outer peripheral surface of the extension portion 105.

The wheel body 102 has a projecting abutment section 107 formed integrally with the upper surface 102a, and a plurality of through-holes 108 formed through the thickness thereof (in the axial direction of the pinion shaft 24).

The projecting abutment section 107 is formed on a predetermined position of the one or upper surface 102a opposed to the auxiliary worm wheel 49. More specifically, the projecting abutment section 107 is in the shape of a ring sharing the same rotation center line CL of the torque delivering worm wheel 48, and has a mean diameter Dc. The rotation center line CL of the torque delivering worm wheel 48 is also a rotation center line of the pinion shaft 24.

The plurality of through-holes 108, each of which has a generally sectorial shape as viewed in plan, are formed in the wheel body 102 at equal circumferential intervals (or pitches) about the rotation center line CL of the torque delivering worm wheel 48. Note that these through-holes 108 are located closer to the rotation center line CL than the projecting abutment section 107, i.e. radially inwardly of the projecting abutment section 107.

As illustrated in FIGS. 5 and 6, the auxiliary worm wheel 49 is provided with a view to eliminating an undesired backlash between the worm 47 and the torque delivering worm wheel 48 and held in meshing engagement with the worm 47. Further, the auxiliary worm wheel 49 is superimposed on the one surface 102a in such a manner that it will not rotate relative to the torque delivering worm wheel 48. The auxiliary worm wheel 49 shares the same rotation center line CL as the torque delivering worm wheel 48.

The following paragraphs set forth in detail the auxiliary worm wheel 49.

The auxiliary worm wheel 49 is a resin-molded component part (i.e., resin molding) that has a biasing member 111 in the form of an integral flat leaf spring formed by insert molding or otherwise. Specifically, the auxiliary worm wheel 49 includes a ring-shaped wheel body 112, and the biasing member or leaf spring 111 of a disk shape incorporated and fixed radially inward of the wheel body 112. The wheel body 112 is in the form of a crown (or cap)-shaped gear having a plurality of teeth 113 formed on its outer peripheral surface and projecting to mesh with the worm 47.

The biasing member or leaf spring 111 is a flat resilient plate positioned in parallel or substantially parallel relation to the one surface 102a of the wheel body 102. The leaf spring 111 has a central fitting hole portion 114 which the rotation center line CL passes centrally therethrough, and a plurality of through-holes 115 and abutment sections 116 alternately arranged along the circumferential edge of the central fitting hole portion 114.

Figure 7:
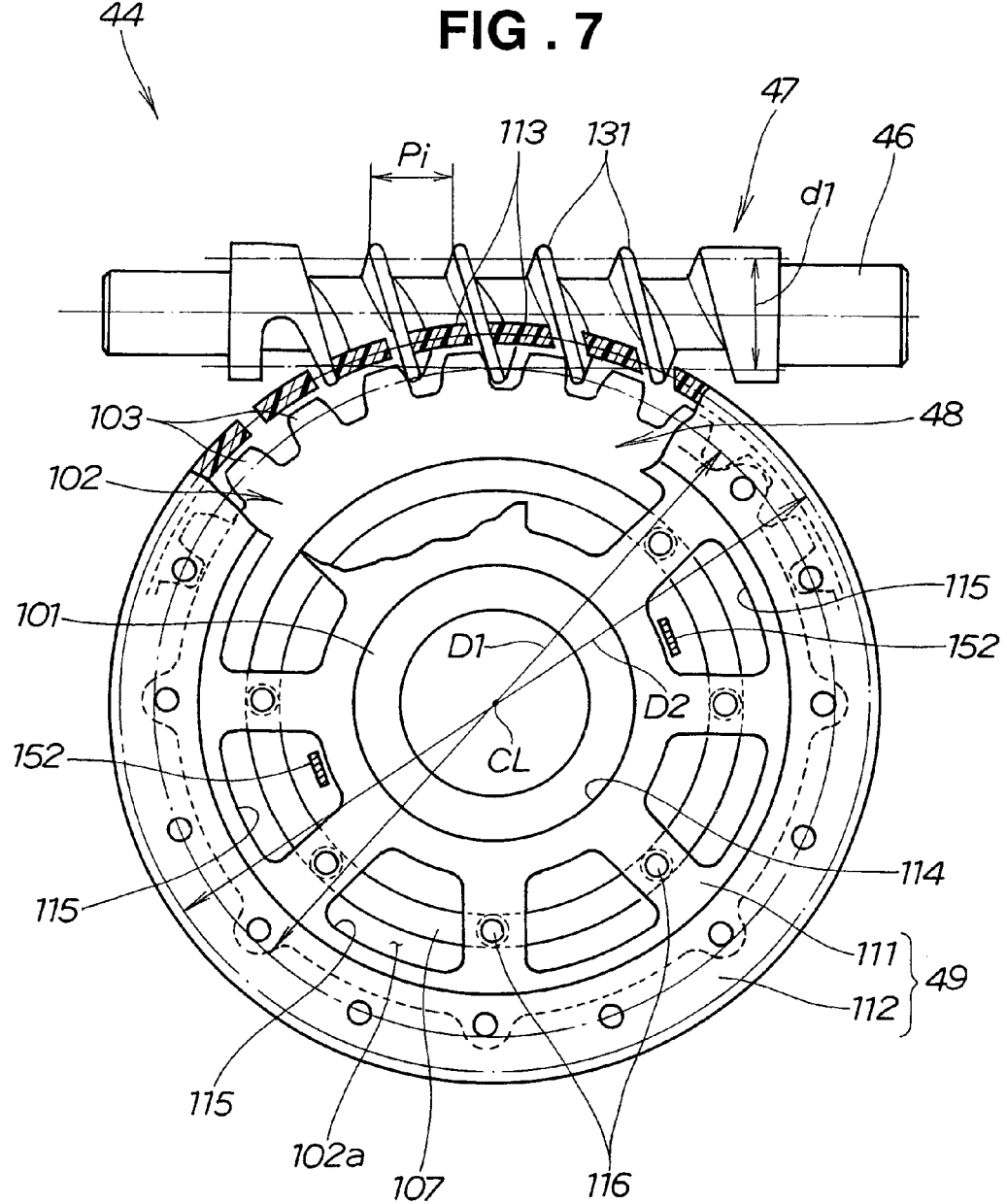
FIG. 7 is a plan view of the worm gear mechanism of FIG. 5.

As seen in FIGS. 5-7, the plurality of through-holes 115 and the plurality of abutment sections 116 are provided to correspond in position to the abutment section 107 of the torque delivering worm wheel 48 (i.e., a circumferential region defined by the mean diameter Dc of the abutment section 107). The through-holes 115 are arranged at equal circumferential pitches, and so are the abutment sections 116 of the auxiliary worm wheel 49.

As illustrated in FIG. 6, the through-holes 115 each have a sectorial shape as viewed in plan and are placed in fluid communication with the through-holes 108 of the torque delivering worm wheel 48.

As seen in FIGS. 5-7, the plurality of abutment sections 116 are arranged between the through-holes 115 and each in the form of a pin-like protrusion having a circular cross section and formed on a surface 111a of the leaf spring 111 opposed to the torque delivering worm wheel 48. Flat distal end surface of each of the protrusions 116 can contact a top end surface of the abutting section 107.

Namely, the torque delivering worm wheel 48 has the projecting abutment section 107 integrally formed on its predetermined position for abutting contact with the surface 111a, opposed thereto, of the leaf spring 111. The leaf spring 111 has the plurality of projecting abutment sections 116 integrally formed on its predetermined position for abutting contact with the surface 102a, opposed thereto, of the torque delivering worm wheel 48.

Stated differently, in the worm gear mechanism 44 of the invention, at least one of the torque delivering worm wheel 48 and leaf spring 111 has the projecting abutment section or sections 107 or 116 for abutting contact with the surface of the other opposed thereto.

As further seen from FIGS. 5 and 6, the auxiliary worm wheel 49 is attached to the torque delivering worm wheel 48 via a collar 141, rotation preventing member 151 and nut 161.

As illustrated in FIG. 6, the collar 141 is a ring-shaped member which has a large-diameter portion 142 to be superimposed on the one surface 102a of the wheel body 102, a small-diameter portion 143 smaller in diameter than the large-diameter portion 142, and a flat portion 144 between the large-diameter portion 142 and the small-diameter portion 143.

The rotation preventing member 151 is a flat annular member, which has a plurality of engaging claws 152 extending from its outer peripheral edge toward the torque delivering worm wheel 48. As seen in FIGS. 6 and 7, the width (circumferential dimension) of each of the engaging claws 152 is smaller than the width (circumferential dimension) of each of the through-holes 108 and 115. As seen from FIGS. 5 and 6, the small-diameter portion 143 of the collar 141 has a height equal to or slightly smaller than a sum of the thicknesses of the flat leaf spring 111 and rotation preventing member 151.

In the worm gear mechanism 44, as also shown in FIGS. 5 and 6, the auxiliary worm wheel 49 can be attached to the torque delivering worm wheel 48 by fitting the collar 141 over the extension portion 105 of the boss section 101, fitting the fitting hole portion 114 over the small-diameter portion 143 of the collar 141, then fitting the rotation preventing member 151 over the fitting hole portion 114 and then screwing and tightening the nut 161 on the rotation preventing member 151. Namely, a central portion of the disk-shaped flat leaf spring 111 can be mounted on the torque delivering worm wheel 48.

As a consequence, the abutment sections 116 abut against the abutment section 107 of the torque delivering worm wheel 48; namely, the flat leaf spring 111 directly contacts the torque delivering worm wheel 48.

The through-holes 108 of the torque delivering worm wheel 48, the through-holes 115 of the auxiliary worm wheel 49, the engaging claws 152 of the rotation preventing member 151 and the fastening nut 161 together constitute a rotation preventing mechanism 150 for preventing rotation of the auxiliary worm wheel 49. Rotational displacement of the auxiliary worm wheel 49 relative to the torque delivering worm wheel 48 is prevented by the engaging claws 152 engaging with the respective through-holes 108 and 115 of the worm wheels 48 and 49.

Combination of the external thread 106, nut 161 and flat leaf spring 111 constitutes a fastening mechanism 160 for fixedly attaching the auxiliary worm wheel 49 to the torque delivering worm wheel 48. Namely, the fastening mechanism 160 fastens the auxiliary worm wheel 49 to the torque delivering worm wheel 48 by the nut 161. With this arrangement, the auxiliary worm wheel 49 is normally urged toward the worm 47 by the force of the leaf spring 111 as the resilient biasing member.

As apparent from the foregoing, the flat leaf spring 111 is a resilient biasing means for normally (resiliently) biasing the auxiliary worm wheel 49 toward the worm 47.

As seen in FIG. 7, the auxiliary worm wheel 49 has a pitch diameter D2 greater than a pitch diameter D1 of the torque delivering worm wheel 48 (i.e., D1<D2).

The worm 47 is formed of metal, such as carbon steel for machine structural use (JIS-G-4051) or other kind of steel. The torque delivering worm wheel 48 and auxiliary worm wheel 49 are formed of resin, such as nylon resin. Because the resin-made torque delivering worm wheel 48 and auxiliary worm wheel 49 mesh with the metal-made worm 47, relatively smooth meshing engagement is achieved, which can thereby reduce meshing noise sound.

Each tooth 131 of the worm 47 has a substantial trapezoidal sectional shape as viewed in a direction perpendicular to the axis of the worm 47. Each tooth 103 of the torque delivering worm wheel 48 has an involute sectional shape as viewed in a direction perpendicular to the axis of the wheel 48. The teeth 131 of the worm 47 are formed by a single thread having a pitch Pi.

Sections (a)-(e) of FIG. 8 shows how the torque delivering worm wheel 48 and the auxiliary worm wheel 49 mesh with each other in the first embodiment of the worm gear mechanism 44. Section (a) of FIG. 8 illustrates a sectional construction of the worm gear mechanism 44 in corresponding relation to FIG. 5, and section (b) of FIG. 8 is a sectional view taken along line b-b of section (a).

As illustrated in (a) and (b), the crown (cap)-shaped auxiliary worm wheel 49 is superimposed on the torque delivering worm wheel 48, in such a manner that its teeth 113 surround an outer peripheral end surface 104 of the torque delivering worm wheel 48, to mesh with the worm 47. Thus, the teeth 113 of the auxiliary worm wheel 49 do not interfere with the worm wheel 48.

Because, as noted above, the pitch diameter D2 of the auxiliary worm wheel 49 is greater than the pitch diameter D1 of the torque delivering worm wheel 48, the auxiliary worm wheel 49 meshes with the worm 47 with a different meshing phase from the torque delivering worm wheel 48. As a consequence, the torque delivering worm wheel 48 can be set to have a sufficient face width that is, for example, generally equal to the outer diameter of the worm 47. Therefore, the teeth 103 of the torque delivering worm wheel 48 can have a sufficient area of contact with the teeth 131 of the worm 47, which can thereby effectively enhance the durability of the worm gear mechanism 44.

Distance from the center of the worm 47 to the pitch circle of the auxiliary worm wheel 49 is represented here by "r", and this distance r can be calculated by Equation (1) below.

$$r=(D1+d1-D2)/2 \qquad \text{Equation (1),}$$

where d1 represents a pitch diameter of the worm 47 defined when the torque delivering worm wheel 48 is meshing with the worm 47.

The distance r may be set to any desired value; it is preferably 0 (zero) in a case where the worm 47 is rotated in a reversible fashion (i.e., in forward and reverse directions). Specifically, it is only necessary to set the pitch diameter D2 of the auxiliary worm wheel 49 such that the teeth 113 of the auxiliary worm wheel 49 do not interfere with the torque delivering worm wheel 48 and yet the worm wheel 49 can appropriately mesh with the worm 47.

Further, the worm gear mechanism 44 is characterized in that the auxiliary worm wheel 49 is shaped like a crown or cap such that its teeth 113 surround the outer peripheral edge surface 104 of the torque delivering worm wheel 48. Thus, despite the auxiliary worm wheel 49 added to the torque delivering worm wheel 48, the former will never interfere with the latter. Therefore, the torque delivering worm wheel 48 can be set to an event more sufficient face width. As a consequence, each tooth 103 of the torque delivering worm wheel 48 can have an even more sufficient area of contact with the corresponding tooth 131 of the worm 47, which can even further enhance the durability of the worm gear mechanism 44.

The worm gear mechanism 44 is further characterized in that a pitch diameter d2 of the worm 47 defined when the auxiliary worm wheel 49 is meshing with the worm 47 can be set smaller than the pitch diameter d1 of the worm 47 defined when the torque delivering worm wheel 48 is meshing with the worm 47 (i.e., d1>d2). Because the pitch diameter d2 is thus set smaller than the pitch diameter d1 whereas the tooth pitch Pi of the worm 47 is constant, a lead angle of the worm teeth 131 of the worm 47 can be increased and the thus-increased lead angle can reduce frictional loss between the worm 47 and the auxiliary worm wheel 49, which can enhance a torque transmission efficiency. The thus-enhanced torque transmission efficiency allows the auxiliary worm wheel 49 to be rotated via the worm 47 with less torque. As a result, the worm gear mechanism 44 can operate with increased smoothness, and the durability of the worm gear mechanism 44 can be enhanced even further.

Section (c) of FIG. 8 is a sectional view taken along line c-c of section (a) of FIG. 8, which particularly shows how the torque delivering worm wheel 48 meshes with the worm 47. Namely, the torque delivering worm wheel 48 meshes with the worm 47 with a right surface 103b of the tooth 103 of the worm wheel 48 contacting a left surface 131a of the tooth 131 of the worm 47.

Section (d) of FIG. 8 is a sectional view taken along line d-d of section (a) of FIG. 8 and section (e) of FIG. 8 is a view showing a sectional construction as viewed in a direction of arrow e in section (b) of FIG. 8, which particularly show how the auxiliary worm wheel 49 meshes with the worm 47. Namely, the auxiliary worm wheel 49 meshes with the worm 47 with a left surface 113a of the tooth 113 contacting a right surface 131b of the tooth 131 of the worm 47. Some backlash (gap) is formed between the left surface 131a of the tooth 131 of the worm 47 and the right surface 113b of the tooth 113 of the auxiliary worm wheel 49.

FIG. 9 is a schematic view of the first embodiment of the worm gear mechanism 44, which particularly shows the arrangements of section (c) and section (d) of FIG. 8 in combination.

FIG. 9 shows that the right surface 103b of the tooth 103 of the torque delivering worm wheel 48 contacts the left surface 131a of the tooth 131 of the worm 47, and that the left surface 113a of the tooth 113 of the auxiliary worm wheel 49 contacts the right surface 131b of the tooth 131 the worm 47 with no backlash or with an extremely small backlash (or gap). Backlashes B1 and B2 formed in such meshing states are set forth below.

The backlash B1 between the tooth 131 of the worm 47 and the tooth 113 of the auxiliary worm wheel 49 has a size X1 (zero or almost zero), while the backlash B2 between the tooth 131 of the worm 47 and the tooth 103 of the torque delivering worm wheel 48 has a size X2. Namely, the worm gear mechanism 44 is also characterized in that the size X1 of the backlash B1 between the tooth 131 of the worm 47 and the tooth 113 of the auxiliary worm wheel 49 is set smaller than the size X2 of the backlash B2 between the tooth 131 of the worm 47 and the tooth 103 of the torque delivering worm wheel 48, i.e. the relationship between the sizes X1 and X2 is "$0 \leq X1 < X2$".

Next, a description will be given about behavior of the first embodiment of the worm gear mechanism 44, with primary reference to FIG. 10.

Section (a) of FIG. 10, which corresponds to FIG. 9, shows the right surface 103b of one tooth 103 of the torque delivering worm wheel 48 contacting the left surface 131a of one tooth 131 of the worm 47. In this state, the backlash B1 between the tooth 131 of the worm 47 and one tooth 113 of the auxiliary worm wheel 49 is very small or zero. Another backlash B2 is formed adjacent to the right surface 131b of the tooth 131 of the worm 47.

As the worm 47 is turned in the forward direction by the motor 43 (see FIG. 3) in the state shown in section (a) of FIG. 10, the tooth 131 of the worm 47 is displaced in a direction of arrow R1 (rightward in the figure). Consequently, the right surface 131b of the tooth 131 of the worm 47 presses the left surface 113a of the tooth 113 of the auxiliary worm wheel 49. With such a pressing force, horizontal and vertical component forces act on the tooth 113 of the auxiliary worm wheel 49.

Namely, in accordance with a pressure angle of the tooth 131 of the worm 47, the left surface 113a of the tooth 113 of the auxiliary worm wheel 49 is subjected to a rotational force (horizontal component force) that rotates the wheel 49 and a displacing force (vertical component force) that displaces the wheel 49 in a direction away from the worm 47, i.e. in a direction where the tooth top of the auxiliary worm wheel 49 moves radially outwardly of the worm 47. By being thus displaced radially outwardly of the worm 47 (i.e., in a direction perpendicular to the obverse surface of the sheet of FIG. 10, section (a)) by the vertical component force, the tooth 113 of the auxiliary worm wheel 49 comes to mesh with the tooth 131 of the worm 47 nearer to the tooth top of the tooth 131.

Namely, the tooth 131 of the worm 47 moves in the direction of arrow R1 while rotationally displacing the tooth 113 of the auxiliary worm wheel 49 radially outwardly of the worm 47 against the biasing force (resilient force) of the leaf spring 111, so that it is brought into a position as indicated in section (c) of FIG. 10 by way of a position of section (b) of FIG. 10.

Thus, the right surface 131b of the tooth 131 of the worm 47 contacts and presses the left surface 103a of the tooth 103 of the torque delivering worm wheel 48, so that the worm wheel 48 is rotationally displaced in a direction of arrow R2.

Namely, by the worm 47 axially displacing the auxiliary worm wheel 49 against a resistance force of the worm wheel 49, the torque delivering worm wheel 48 can be caused to start rotating slightly later than the rotational displacement of the auxiliary worm wheel 49. In this way, the auxiliary worm wheel 49 rotates accompanied by the torque delivering worm wheel 48.

In this manner, the tooth 131 of the worm 47 can be gently brought into contact with the tooth 103 of the torque delivering worm wheel 48, and thus the durability of the worm gear mechanism 44 can be enhanced even further. In addition, because the backlash B2 can be removed, it is possible to even further prevent production of hitting sound between the teeth of the worm 47 and the torque delivering worm wheel 48.

As apparent from the forgoing, the tooth 131 of the rotating worm 47 pushes the tooth 113 of the auxiliary worm wheel 49 upwardly along the axis of the pinion shaft 24 against the biasing force (resilient force) of the leaf spring 111 (see FIG. 5), by pressing the tooth 113 in the direction of arrow R1. Then, as the worm 47 is turned via the motor 43 (see FIG. 3) in the reverse direction in the state shown in section (c) of FIG. 10, the tooth 131 is displaced in a direction opposite from arrow R1 (leftward direction in the figure). Thus, as the right surface 131b of the tooth 131 is displaced in the direction opposite from arrow R1, the tooth 113 of the auxiliary worm wheel 49 is pushed back downward along the axis of the pinion shaft 24, by the biasing force of the leaf spring 11, so that it automatically returns to the state shown in section (a) of FIG. 10. In this way, it is possible to even further prevent production of hitting sound between the teeth 103 and 131 of the worm 47 and the torque delivering worm wheel 48.

Further, as viewed in the axial direction of the worm 47 like in section (a) of FIG. 8, the face width of the torque delivering worm wheel 48 can be located symmetrically about a meshing region where the torque delivering worm wheel 48 meshes with the tooth of the worm 47 (i.e., center line CW passing the rotation center of the worm 47 as indicated in section (a) of FIG. 8). Furthermore, the torque delivering worm wheel 48 can be formed integrally or as an integral piece, without a need for forming therein a groove for retaining a backlash-preventing component as conventionally done in the known worm gear mechanism (see FIG. 18). As a result, the teeth 103 of the torque delivering worm wheel 48 can be formed with an enhanced accuracy, and the torque delivering worm wheel 48 can be maintained in good meshing with the worm 47.

To sum up, the above-described first embodiment of the worm gear mechanism 44 is characterized in that, as shown in FIGS. 5 and 6, the backlash B1 between the tooth 131 of the worm 47 and the tooth 113 of the auxiliary worm wheel 49 is set smaller than the backlash B2 between the tooth 131 of the worm 47 and the tooth 103 of the torque delivering worm wheel 48, and in that the auxiliary worm wheel 49 is superimposed on the torque delivering worm wheel 48 and normally biased via the biasing member 111 against the worm 47. Even with such simple arrangements, the durability of the worm gear mechanism 44 can be significantly enhanced, and it is also possible to prevent production of hitting sound between the teeth 103 and 131 of the worm 47 and the torque delivering worm wheel 48.

Further, in the worm gear mechanism 44, the auxiliary worm wheel 49 is normally resiliently pressed against the torque delivering worm wheel 48 by the fastening mechanism 160 via the biasing member 111 as shown in FIG. 5, so that the auxiliary worm wheel 49 can be imparted with an appropriate preload. Thus, the auxiliary worm wheel 49 can be normally biased against the tooth 131 of the worm 47 and torque delivering worm wheel 48 via the biasing member 111 smoothly and stably.

Furthermore, in the worm gear mechanism 44, the biasing member 111 is in the form of the disk-shaped leaf spring (that may also be a coned disk spring) 111 incorporated and fixed in the auxiliary worm wheel 49, and the biasing member 111 is held in direct contact with the torque delivering worm wheel 48. Therefore, the number of the necessary component parts in the worm gear mechanism 44 can be significantly reduced. In addition, the flat leaf spring 111 can be readily incorporated into and fixed in the auxiliary worm wheel 49 that is a resin molding.

Furthermore, in the worm gear mechanism 44, at least one of the biasing member 111 and torque delivering worm wheel 48 has the projecting abutment section or sections 107 or 106, formed integrally thereon, for abutting contact with the surface of the other opposed thereto. Therefore, the auxiliary worm wheel 49 and torque delivering worm wheel 48 can be stably held in place, so that it is possible to prevent production of hitting sound between the teeth 103 and 131 of the worm 47 and the torque delivering worm wheel 48 (see FIG. 9).

Furthermore, in the worm gear mechanism 44, no particular fastening member, such as a bolt or rivet, is necessary for assemblying the biasing member 111 into the auxiliary worm wheel 49, and thus the auxiliary worm wheel 49 and hence the worm gear mechanism 44 can be reduced in weight. Furthermore, because the resin-made auxiliary worm wheel 49 is small in weight, the overall mass of the resin-made auxiliary worm wheel 49 with the biasing member 111 incorporated therein can be reduced. The reduced mass can reduce the inertia of the auxiliary worm wheel 49, and the reduced inertia can reduce an impact applied from the auxiliary worm wheel 49 to the leaf spring 111 at a time point when the worm wheel 49 has started rotating. Consequently, stress applied to the biasing member 111 can be reduced, so that the biasing member 111 can be further reduced in weight by, for example, reducing the thickness of the biasing member 111. With the reduced overall mass of the auxiliary worm wheel 49 having the biasing member 111 incorporated therein, the steering feel of the electric power steering apparatus 10 where the worm gear mechanism 44 of the invention is employed can be even further improved.

The worm gear mechanism 44 is also characterized by the provision of the rotation preventing mechanism 150 for preventing rotational displacement of the auxiliary worm wheel 49 relative to the torque delivering worm wheel 48. Where the central portion of the auxiliary worm wheel 49 is attached to the torque delivering worm wheel 48 with the mechanism 150 in such a manner as to prevent rotation of the central portion of the auxiliary worm wheel 49 relative to the torque delivering worm wheel 48, the auxiliary worm wheel 49 can be readily positioned and assembled to the torque delivering worm wheel 48 with an increased ease and reliability. Further, in the electric power steering apparatus 10 employing the worm gear mechanism 44 of the invention, the appropriate relative positional relationship of the auxiliary worm wheel 49 to the torque delivering worm wheel 48 can be maintained reliably despite an impact acting on the worm gear mechanism 44 due to a reaction force from a road surface, aging (or aged deterioration) of the mechanism 44, etc.

Furthermore, as the worm 47 turns in the forward direction, in the state shown in section (a) of FIG. 10, the tooth 131 moves in the direction of arrow R1, so that the auxiliary worm wheel 49 can be first rotationally displaced as illustrated in section (b) of FIG. 10 and, a little later than the rotational displacement of the auxiliary worm wheel 49, the torque delivering worm wheel 48 can be started to rotate as illustrated in section (c) of FIG. 10. As a consequence, the tooth 131 of the worm 47 can be gently brought into contact with the tooth 103 of the torque delivering worm wheel 48.

The following paragraphs describe modifications of the first embodiment of the worm gear mechanism 44 shown in FIG. 5, where the same elements as in the first embodiment of FIG. 5 are indicated by the same reference characters and will not be described in detail here to avoid unnecessary duplication.

FIG. 11 is a sectional view, generally corresponding to FIG. 5, showing a first modification of the worm gear mechanism 44. The first modification of the worm gear mechanism 44 shown in FIG. 11 is characterized in that the biasing member (i.e., resilient member) for biasing the auxiliary worm wheel 49 against the worm 47 is in the form of a compression spring 171.

The entire auxiliary worm wheel 49 is a resin molding, which is superimposed on the torque delivering worm wheel 48 and fitted over the pinion shaft 24 in such a manner that axial movement of the worm wheel 49 along the pinion shaft 24 is appropriately restricted. The compression spring 171 is interposed between the auxiliary worm wheel 49 and a spring support disk 172 mounted on the pinion shaft 24.

FIG. 12 is a sectional view, generally corresponding to FIG. 11, showing a second modification of the worm gear mechanism 44. According to the second modification of the worm gear mechanism 44 shown in FIG. 12, the auxiliary worm wheel 49, the entirety of which is a resin molding, is arranged to perform the function of the above-described "biasing member" (i.e., resilient member) of FIG. 11 for biasing the wheel 49 against the worm 47; thus no separate biasing member is provided here.

Specifically, in the second modification, the auxiliary worm wheel 49 is fitted over the pinion shaft 24 in such a manner that axial movement of the worm wheel 49 along the pinion shaft 24 is appropriately restricted. More specifically, the auxiliary worm wheel 49 has a boss portion 49a fitted over the pinion shaft 24, an engaging hook portion 49b formed on the boss portion 49a, a disk-shaped biasing portion 49c of a small thickness formed along the outer periphery of the boss portion 49a, and an annular wheel body portion 49d formed along the outer periphery of the biasing portion 49c.

The engaging hook portion 49b engages with an engaging recessed portion 48a of the torque delivering worm wheel 48 so that the auxiliary worm wheel 49 can be attached to the torque delivering worm wheel 48. The biasing portion 49c is resiliently deformable along the axis of the pinion shaft 24, and the wheel body portion 49d is biased toward the worm 47 via a resilient force of the biasing portion 49c. The wheel body portion 49d has a plurality of teeth 113. By the resiliency of the biasing portion 49c, the auxiliary worm wheel 49 can be imparted with a preload acting toward the torque delivering worm wheel 48.

According to the second modification, the worm gear mechanism 44 can be constructed simply with a reduced number of component parts. In addition, the auxiliary worm wheel 49 can be readily positioned and assembled to the torque delivering worm wheel 48 with an increased ease and reliability.

Next, a description will be given about second embodiments of the electric power steering apparatus and worm gear mechanism, with reference to FIGS. 13-16. The second embodiment of the electric power steering apparatus 10 is generally similar in construction to the first embodiment of the electric power steering apparatus 10, except that it employs the second embodiment of the worm gear mechanism 44A. The same elements as in the first embodiment of FIGS. 1-10 are indicated by the same reference characters and will not be described in detail here to avoid unnecessary duplication. Further, the same arrangements as shown in FIGS. 1-4 are employed in the second embodiment.

FIG. 13 is a sectional view showing only a left half of the second embodiment of the worm gear mechanism 44A, which generally corresponds to FIG. 5. FIG. 14 is an exploded view of the second embodiment of the worm gear mechanism 44A.

As seen in FIGS. 13 and 14, the second embodiment of the worm gear mechanism 44A is characterized by modified constructions of the torque delivering worm wheel 48 and auxiliary worm wheel 49. The following paragraphs describe the modified constructions of the worm wheels 48 and 49.

The torque delivering worm wheel 48 in the second embodiment is characterized in that a flat seat surface portion 102b is formed centrally on the one surface 102a of the wheel body 102, and in that a male (external) thread 106 is formed on a distal end region of the extension portion 105 extending axially from the seat surface portion 102b. The extension portion 105 has two parallel flat surfaces 109 on its opposite outer peripheral regions.

Here, the biasing (resilient) member or leaf spring 111 in the auxiliary worm wheel 49 is in the form of a "disk spring" having an inverted, truncated cone shape, which is slanted downward from the wheel body 112 toward its center region. Bottom of the inverted, truncated cone is formed as a flat, horizontal mounting surface portion 117 having a fitting hole portion 114. The biasing member or coned disk spring 111 is positioned in such a manner that it slants downward toward the one surface 102a of the wheel body 102. The auxiliary worm wheel 49 is superimposed on the one surface 102a of the wheel body 102 with the mounting surface portion 117 placed on the seat surface portion 102b.

In the worm gear mechanism 44A arranged in the above-described manner, the fitting hole portion 114 of the biasing member 111 is fitted over the extension portion 105, a flat washer 181 is fitted over the hole portion 114, and the nut 161 is screwed onto the external thread 106, so that the mounting surface potion 117 can be firmly fastened via the seat surface portion 102b and nut 161. As a consequence, the central portion of the auxiliary worm wheel 49 can be attached to the torque delivering worm wheel 48 in such a manner that rotation of the former relative to the latter can be prevented by a fastening frictional force.

The second embodiment of the worm mechanism 44A does not have the abutment sections 107 and 106 (see FIG. 5) of the first embodiment, but includes the coned disk spring 111 as the biasing member for normally biasing (resiliently pressing) the auxiliary worm wheel 49 against the worm 47. As a consequence, the auxiliary worm wheel 49 can mesh with the worm 47 with no substantial backlash.

The flat washer 181 has a fitting hole 182 and two parallel surfaces 183 on its opposite inner peripheral portions in conformity to the sectional shape of the extension portion 105. Thus, the flat washer 181 fitted over the extension portion 105 can be reliably prevented from rotating relative to the torque delivering worm wheel 48.

Combination of the two parallel surfaces 109 formed on the outer periphery of the extension portion 105, flat washer 181 interposed between the leaf spring 111 and the nut 161 and two parallel surfaces 183 on the inner periphery of the flat washer 181 constitutes a rotation preventing mechanism 180. The reason for such arrangements is as follows. In assembling the worm gear mechanism 44A, the teeth 113 of the auxiliary worm wheel 49 are positioned relative to the worm 47 and torque delivering worm wheel 48, and then the nut 161 is screwed and tightened on the torque delivering worm wheel 48. During that time, the flat washer 181 will not rotate relative to the torque delivering worm wheel 48 along with the nut 161. Therefore, during the assembly, it is possible to prevent unwanted displacement of the teeth 113 of the auxiliary worm wheel 49.

In the second embodiment where the central portion of the auxiliary worm wheel 49 is attached to the torque delivering worm wheel 48 against rotation of the former relative to the latter, the auxiliary worm wheel 49 can be readily positioned and assembled to the torque delivering worm wheel 48 with an increased ease and reliability. Further, in the steering apparatus 10 employing the worm gear mechanism 44A of the invention, the appropriate relative positional relationship of the auxiliary worm wheel 49 to the torque delivering worm wheel 48 can be maintained reliably despite an impact acting on the worm gear mechanism 44A due to a reaction force from a road surface, aging of the mechanism 44A, etc. As a result, rotational timing relationship between the torque delivering worm wheel 48 and auxiliary worm wheel 49 can be maintained reliably for a long period of time.

Sections (a)-(d) of FIG. 15 are views explanatory of how the worm 47 and auxiliary worm wheel 49 mesh with each other in the second embodiment of the worm gear mechanism 44A and also explanatory of behavior of the second embodiment, from which illustration of the torque delivering worm wheel 48 is omitted for clarity. Specifically, section (a) of FIG. 15 shows a sectional construction of the worm gear mechanism 44A in corresponding relation to FIG. 13, section (b) is a view taken in a direction of arrow b in section (a) and showing a sectional construction as viewed from the rotation center line of the auxiliary worm wheel 49, section (c) shows in enlarged scale principal portions in section (b), and section (d) shows behavior of the worm gear mechanism 44A in corresponding relation to section (c).

As seen from FIG. 13, the central portion of the leaf spring 111 is attached to the torque delivering worm wheel 48, and thus the auxiliary worm wheel 49 can be displaced, against the biasing force of the leaf spring 111, in a direction away from the worm 47 as indicated by arrow R3 in section (a) of FIG. 15, i.e. radially outwardly of the worm 47.

When the worm 47 is in a stationary or rest position, the auxiliary worm wheel 49 meshes with the worm 47, with no substantial backlash, at a position P1 on the pitch diameter d2 of the worm 47, as seen in sections (a)-(c) of FIG. 15.

As the worm 47 rotates in the forward direction, the tooth 131 of the worm 47 is displaced in the direction of arrow R1 (rightward in the figure). Thus, as illustrated in section (c) of FIG. 15, the right surface 131b of the worm tooth 131 presses the left surface 113a of the tooth 113 of the auxiliary worm wheel 49. Due to the pressing force f1 of the worm tooth 131, horizontal and vertical component forces f2 and f3 act on the left surface 113a of the worm wheel tooth 113.

Namely, with the pressure angle α of the worm tooth 131, the left surface 113a of the worm wheel tooth 113 is subjected to a rotational force (horizontal component force) that rotates the wheel 49 and a displacing force (vertical component force) that displaces the wheel 49 in a direction away from the worm 47, i.e. in a direction where the tooth top of the auxiliary worm wheel 49 moves radially outwardly of the worm 47 (in the direction of arrow R3).

As a result of the displacement of the worm wheel 49 in the direction of arrow R3, the auxiliary worm wheel 49 comes to mesh with the worm tooth 131 at a point P2 closer to the top of the tooth 131.

Namely, the tooth 131 of the worm 47 is displaced, against the biasing force of the leaf spring 111 (see FIG. 13), by a distance Y1 in the direction of arrow R1, as a result of which the meshing point shifts from the point P1 to the point P2. The biasing force of the leaf spring 111 serves as a rotation resistance that acts in such a direction to as return the auxiliary worm wheel 49 to the original position.

Sections (a)-(d) of FIG. 16 are views explanatory of how the worm 47, torque delivering worm wheel 48 and auxiliary worm wheel 49 mesh with one another in the second embodiment of the worm gear mechanism 44A and also explanatory of behavior of the second embodiment. Specifically, section (a) of FIG. 16 shows a sectional construction of the worm gear mechanism 44A in a neutral position, section (b) is a view taken in a direction of arrow b in section (a) and showing sectional constructions of the worm 47 and auxiliary worm wheel 49 as viewed from the rotation center line of the auxiliary worm wheel 49, and section (c) shows the worm gear mechanism 44A in a state where a worm tooth 131 has been brought into contact with a tooth 103 of the torque delivering worm wheel 48. Further, section (d) of FIG. 16 is a view taken in a direction of arrow d in section (c) and showing sectional constructions of the worm 47 and auxiliary worm wheel 49 as viewed from the rotation center line of the auxiliary worm wheel 49.

More specifically, sections (a) and (b) of FIG. 16 show that, in the neutral position, left and right teeth 103 of the torque delivering worm wheel 48 are meshing with a tooth 131 of the worm 47 with backlashes B4 and B4 of a generally same size.

This meshing state is maintained by meshing the auxiliary worm wheel 49 with the worm 47 with no backlash (B3) there-between.

The backlash B3 between the teeth 131 and 113 of the worm 47 and auxiliary worm wheel 49 has a 0 (zero) size X3, and the backlash B4 between the teeth 131 and 103 of the worm 47 and torque delivering worm wheel 48 has a size X4. Namely, the second embodiment of the worm gear mechanism 44A is characterized in that the backlash B3 between the teeth 131 and 113 of the worm 47 and auxiliary worm wheel 49 is set smaller than the backlash B4 between the teeth 131 and 103 of the worm 47 and torque delivering worm wheel 48, to satisfy a condition of "X3<(X4×2)". Note that the size X3 of the backlash B3 between the teeth 131 and 113 of the worm 47 and auxiliary worm wheel 49 may be slightly greater than zero.

Therefore, in the neutral position, the left and right teeth 103 of the torque delivering worm wheel 48 do not contact the tooth 131 of the worm 47, so that no frictional torque is produced between the teeth 131 and 103 when the worm 47 has started rotating.

AS the worm 47 is turned in the forward direction in that state, the worm tooth 131 is displaced in the direction of arrow R1 (rightward in the figure). Thus, as illustrated in section (b) of FIG. 16, the right surface 131b of the worm tooth 131 presses the left surface 113a of the tooth 113 of the auxiliary worm wheel 49. Due to the pressing force of the worm tooth 131, the auxiliary worm wheel 49 is displaced in a direction away from the worm 47, i.e. in a direction where the auxiliary worm wheel 49 moves radially outwardly of the worm 47 (in the direction of arrow R3).

As a result of the displacement of the worm wheel 49 in the direction of arrow R3, the auxiliary worm wheel 49 comes to mesh with the worm tooth 131 at a point closer to the top of the tooth 131, as seen in section (d) of FIG. 16. Namely, as a result of the displacement of the meshing point between the tooth surfaces 131b and 113a, the worm tooth 131 moves in the direction of arrow R1.

Namely, because the worm tooth 131 has moved, from the position shown in section (a) of FIG. 16, in the arrow R1 direction by a distance corresponding to the backlash B4, the right surface 131b of the worm tooth 131 presses the left surface 103a of the tooth 103 of the torque delivering worm wheel 48, so that the thus-pressed torque delivering worm wheel 48 rotates in the direction of arrow R2.

As apparent from the foregoing, the tooth 113 of the auxiliary worm wheel 49 is displaced, against the bias of the leaf spring 111, by the worm 47 radially outwardly of the worm 47, and, a little later than the displacement of the auxiliary worm wheel 49, the torque delivering worm wheel 48 starts to be rotated by the worm 47. After that, the auxiliary worm wheel 49 rotates accompanied by the torque delivering worm wheel 48.

In this way, the tooth 131 of the worm 47 can be gently brought into contact with the tooth 103 of the torque delivering worm wheel 48. Thus, the durability of the worm gear mechanism 44A can be enhanced even further. In addition, because the backlash B4 can be removed, it is possible to even further prevent production of hitting sound between the teeth 131 and 103 of the worm 47 and the torque delivering worm wheel 48.

Then, as the worm 47 is turned via the motor 43 (see FIG. 3) in the reverse direction in the state shown in sections (c) and (d) of FIG. 16, the worm tooth 131 is displaced in the direction opposite from arrow R1 (leftward direction in the figure). Thus, as the right surface 131b of the tooth 131 is displaced in the direction opposite from arrow R1, the tooth 113 of the auxiliary worm wheel 49 is pushed downward along the axis of the pinion shaft 24, by the biasing force of the leaf spring 111 (see FIG. 13), so that it automatically returns to the state shown in sections (a) and (b) of FIG. 16. In this way, it is possible to even further prevent production of hitting sound between the teeth 103 and 131 of the worm 47 and the torque delivering worm wheel 48.

To sum up, the above-described second embodiment of the worm gear mechanism 44A is characterized in that the central portion of the auxiliary worm wheel 49 is attached to the torque delivering worm wheel 48 against rotation of the former relative to the latter. Thus, when the rotational force is delivered from the worm 47 to the auxiliary worm wheel 49, the tooth 113 of the auxiliary worm wheel 49 is subjected to a component force, corresponding to the pressure angle α of the worm tooth 131, in such a direction where the tooth top is displaced radially outwardly of the worm 47. With the component force, the auxiliary worm wheel 49 is displaced, against the biasing of the leaf spring 111, away from the worm 47. The biasing of the leaf spring 111 serves as a resistance to the above-mentioned component force.

Thus, against the resistance by the leaf spring 111, the auxiliary worm wheel 49 can be displaced, by the worm 47, radially outwardly of the worm 47, and, a little later than the displacement of the auxiliary worm wheel 49, the torque delivering worm wheel 48 can be started to be rotated by the worm 47. Consequently, the tooth 131 of the worm 47 can be gently brought into contact with the tooth 103 of the torque delivering worm wheel 48. Thus, the durability of the worm gear mechanism 44A can be enhanced even further. In addition, because the backlash B4 can be removed, it is possible to even further prevent production of hitting sound between the teeth 131 and 103 of the worm and the torque delivering worm wheel 48.

Thus, with the simple arrangements that the backlash B3 between the teeth 131 and 113 of the worm 47 and auxiliary worm wheel 49 is set smaller than the backlash B4 between the teeth 131 and 103 of the worm 47 and torque delivering worm wheel 48 and the auxiliary worm wheel 49 is superimposed on and biased against the torque delivering worm wheel 48 via the biasing member 111, the durability of the worm gear mechanism 44A can be significantly enhanced. Further, by eliminating the backlashes B4, it is possible to efficiently prevent production of hitting sound between the teeth 131 and 103 of the worm and the torque delivering worm wheel 48.

In other respects than the above-described, the second embodiment of the worm gear mechanism 44A behaves similarly to the first embodiment and achieves benefits similar to those achievable by the first embodiment.

Note that the electric motor in the electric power steering apparatus of the present invention is not limited to the construction for generating steering assist torque corresponding to a steering torque detection signal and may be of any other suitable construction as long as it can generate steering assist torque and deliver the steering assist torque via the worm gear mechanism.

Further, in the present invention, the resilient biasing member for normally biasing the worm 47 against the torque delivering worm wheel 48 may be implemented by any other suitable means than the leaf and coned disk springs 111 (FIGS. 5 and 13), compression spring 171 (FIG. 11) and biasing portion 49c of a thin disk shape (FIG. 12) formed on the auxiliary worm wheel 49.

The size and biasing force intensity of the resilient biasing member, such as the leaf or disk spring 111 (FIG. 5 or 13), compression spring 171 (FIG. 11) or biasing portion 49c (FIG. 12) may be set to any suitable values. For example, the biasing force intensity of the resilient biasing member, may be set such that hitting sound between the teeth 103 and 131 can be effectively prevented when the electric power steering apparatus 10 (FIG. 1) has been operated or turned during high-speed or medium-speed travel of the vehicle. Because, in order to achieve an improved comfortability in the vehicle compartment, it is preferable to prevent such hitting sound during high-speed or medium-speed travel of the vehicle.

Furthermore, the auxiliary worm wheel 49 may be arranged to rotate relative to the torque delivering worm wheel 48 within an appropriately restricted range. For example, if the auxiliary worm wheel 49 is mounted, via the rotation preventing mechanism 150 shown in FIGS. 5-7, in such a manner as to slidingly rotate relative to the torque delivering worm wheel 48, the range of the relative rotation may be adjusted via the rotation preventing mechanism 150; in this case, the rotational timing relationship between the torque delivering worm wheel 48 and auxiliary worm wheel 49 can be maintained with an increased reliability.

In such a case too, by the worm 47 rotating in the forward direction to displace the tooth 131 in the direction of arrow R1 from the state shown in section (a) of FIG. 10, the auxiliary worm wheel 49 can be rotated against the rotational resistance as illustrated in section (b) of FIG. 10, and, a little later than the displacement of the auxiliary worm wheel 49, the torque delivering worm wheel 48 can be started to be rotated as illustrated in section (c) of FIG. 10. As a consequence, the tooth 131 of the worm 47 can be gently brought into contact with the tooth 103 of the torque delivering worm wheel 48.

The worm gear mechanism of the present invention is particularly suitable for use in vehicular electric power steering apparatus where steering torque generated by operation of the steering wheel is detected by a steering torque sensor, the electric motor generates steering assist torque in accordance with a steering torque detection signal from the steering torque sensor and then the steering assist torque is delivered to the steering system.

Obviously, various minor changes and modifications of the present invention are possible in the light of the above teaching. It is therefore to be understood that within the scope of the appended claims the invention may be practiced otherwise than as specifically described.

What is claimed is:

1. A worm gear mechanism, comprising:
   a driving worm;
   a torque delivering worm wheel meshing at a first meshing portion of said driving worm for transmitting torque from said driving worm to a load side;
   an auxiliary worm wheel concentrically superimposed on said torque delivering worm wheel to have a same rotation center line,
   wherein the auxiliary worm wheel includes a bent portion having a plurality of teeth formed on an outer peripheral surface thereof, the plurality of teeth projecting toward the torque delivering worm wheel,
   the bent portion being provided only in a region that is radially outward from the same rotation center line of the torque delivering worm wheel so that the plurality of teeth surround an outer peripheral end surface of the torque delivering worm wheel,
   wherein the plurality of teeth meshes at a second meshing portion of said driving worm,
   wherein the second meshing portion is provided not to be in a plane extending from the first meshing portion in a direction of a tooth width of said torque delivering worm wheel,
   the second meshing portion is provided only in a region that is radially outward from the same rotation center line and distanced from the first meshing portion,
   said auxiliary worm wheel having a pitch diameter greater than that of said torque delivering worm wheel; and
   a biasing member that normally biases said auxiliary worm wheel against said driving worm in an axial direction.

2. A worm gear mechanism as claimed in claim 1, wherein said biasing member comprises a disk-shaped leaf spring incorporated in said auxiliary worm wheel and supported by said torque delivering worm wheel.

3. A worm gear mechanism as claimed in claim 2, wherein at least one of said biasing member and said torque delivering worm wheel has a projecting abutment section formed integrally at a predetermined position for contact with an opposing surface of the other of said biasing member and said torque delivering worm wheel.

4. A worm gear mechanism as claimed in claim 2, wherein said auxiliary worm wheel is a resin molding having the leaf spring integrally molded therewith.

5. A worm gear mechanism as claimed in claim 1, which further comprises a rotation preventing mechanism for preventing rotational displacement of said auxiliary worm wheel relative to said torque delivering worm wheel.

6. An electric power steering apparatus, comprising:
   the worm gear mechanism as recited in claim 1;
   a steering system extending from a steering wheel of a vehicle to a steerable wheel; and
   an electric motor for generating torque and delivering the torque to said steering system via said worm gear mechanism.

7. The worm gear mechanism according to claim 1, wherein the auxiliary worm wheel includes a crown-shaped gear.

8. The worm gear mechanism according to claim 1, wherein said torque delivering worm wheel includes a plurality of teeth formed on an outer peripheral surface thereof.

9. The worm gear mechanism according to claim 1, wherein said torque delivering worm wheel is cylindrically shaped.

* * * * *